United States Patent
Li et al.

(10) Patent No.: US 12,093,726 B2
(45) Date of Patent: Sep. 17, 2024

(54) METHOD, APPARATUS, AND TERMINAL FOR ACCELERATING COLD STARTUP OF AN APPLICATION

(71) Applicant: HUAWEI TECHNOLOGIES CO., LTD., Guangdong (CN)

(72) Inventors: Tao Li, Hangzhou (CN); Wanglai Yao, Hangzhou (CN); Fei Ye, Hangzhou (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 654 days.

(21) Appl. No.: 17/230,737

(22) Filed: Apr. 14, 2021

(65) Prior Publication Data
US 2021/0232429 A1 Jul. 29, 2021

Related U.S. Application Data

(63) Continuation of application No. PCT/CN2019/111015, filed on Oct. 14, 2019.

(30) Foreign Application Priority Data

Oct. 15, 2018 (CN) .......................... 201811198385.1

(51) Int. Cl.
*G06F 9/48* (2006.01)
*G06F 9/38* (2018.01)
(Continued)

(52) U.S. Cl.
CPC .......... *G06F 9/4881* (2013.01); *G06F 9/3877* (2013.01); *G06F 9/44505* (2013.01);
(Continued)

(58) Field of Classification Search
CPC ................. G06F 9/4881; G06F 9/3877; G06F 9/44505; G06F 9/449; G06F 9/5044;
(Continued)

(56) References Cited

U.S. PATENT DOCUMENTS

| 6,353,845 B1* | 3/2002 | Torzewski | ............ | G06F 9/4843 710/6 |
| 2014/0129814 A1* | 5/2014 | Bi | .......................... | G06F 9/4401 713/1 |

(Continued)

FOREIGN PATENT DOCUMENTS

| CN | 101625647 A | 1/2010 |
| CN | 104133691 A | 11/2014 |

(Continued)

OTHER PUBLICATIONS

Singh Atikant et al:A method to improve application launch performance in Android devices 2016 International Conference on Internet of Things and Applications(IOTA) IEEE Jan. 22, 2016 (Jan. 22, 2016) total:4pages.
Anonymous:App Startup Time Android Developers Sep. 12, 2018,XP55844893 total:8pages.

*Primary Examiner* — Jorge A Chu Joy-Davila
(74) *Attorney, Agent, or Firm* — WOMBLE BOND DICKINSON (US) LLP

(57) ABSTRACT

This application provides a method and an apparatus, for accelerating cold startup of an application. The method includes after identifying an event that instructs an operating system of a terminal to cold start up an application, obtaining, from a plurality of dimensions, current status information related to the cold startup of the application, where the current status information includes a hardware configuration of the terminal, current load of the operating system of the terminal, resource overheads for cold starting up the application, and duration corresponding to each of a plurality of tasks in a process of cold starting up the application. The method also includes determining, by analyzing the current status information, a plurality of objects that need to be optimized in the current process of cold starting up the (Continued)

application; and then obtaining, based on the determined objects.

17 Claims, 6 Drawing Sheets

(51) Int. Cl.
*G06F 9/445* (2018.01)
*G06F 9/448* (2018.01)
*G06F 9/50* (2006.01)
*G06F 9/54* (2006.01)

(52) U.S. Cl.
CPC ............ *G06F 9/449* (2018.02); *G06F 9/5044* (2013.01); *G06F 9/541* (2013.01)

(58) Field of Classification Search
CPC ............... G06F 9/541; G06F 2201/865; G06F 2209/508; G06F 9/445; G06F 9/5005; G06F 11/3051; G06F 11/3055; G06F 11/3409; G06F 9/44578; G06F 9/505; Y02D 10/00
See application file for complete search history.

(56) References Cited

U.S. PATENT DOCUMENTS

| | | | |
|---|---|---|---|
| 2015/0178219 A1* | 6/2015 | Aslot | G06F 12/0891 |
| | | | 711/133 |
| 2016/0004574 A1 | 1/2016 | Liu et al. | |
| 2018/0024849 A1 | 1/2018 | Zhou | |
| 2018/0365037 A1* | 12/2018 | Zeng | G06F 9/445 |
| 2019/0095186 A1* | 3/2019 | Jozsa | G06F 8/71 |

FOREIGN PATENT DOCUMENTS

| | | |
|---|---|---|
| CN | 104572139 A | 4/2015 |
| CN | 106445617 A | 2/2017 |
| CN | 106547598 A | 3/2017 |
| CN | 106681772 A | 5/2017 |
| CN | 107066290 A | 8/2017 |
| CN | 107748684 A | 3/2018 |
| CN | 107831887 A | 3/2018 |
| CN | 107943576 A | 4/2018 |
| CN | 108762833 A | 11/2018 |
| IN | 105630543 A | 6/2016 |
| WO | 2013163903 A1 | 11/2013 |

* cited by examiner

METHOD, APPARATUS, AND TERMINAL FOR ACCELERATING COLD STARTUP OF AN APPLICATION

CROSS-REFERENCE TO RELATED APPLICATIONS

This application is a continuation of International Application No. PCT/CN2019/111015, filed on Oct. 14, 2019, which claims priority to Chinese Patent Application No. 201811198385.1, filed on Oct. 15, 2018. The disclosures of the aforementioned applications are hereby incorporated by reference in their entireties.

TECHNICAL FIELD

The present invention relates to the computer field, and in particular, to a method, an apparatus, and a terminal for cold starting up an application.

BACKGROUND

With popularization of smart terminals, more and more applications are installed on the terminals, and a user usually opens a plurality of applications and switches between the plurality of applications. In an Android system, there are three startup modes, and cold startup of an application is a relatively-long-time-consuming startup mode. The cold startup of the application means that when the application is started up, there are no processes used to run the application in an operating system, in other words, in a startup process of the application, the operating system creates a new process and allocates the new process to the application.

In the foregoing cold startup process, various resources need to be consumed by the process used to start up the application and the operating system that runs the application. These resources may include a processor, for example, a Central Processing Unit (CPU) or a Graphics Processing Unit (GPU), a memory, an Input/Output (I/O) resource, and a network resource. Because a plurality of applications are installed on the terminal, a resource allocation manner affects a startup time of the application.

In an existing method for starting up an application, impact of resource allocation on a startup time of an application is considered. For example, CPU resource allocation is considered in a CPU frequency boost solution of Qualcomm®, and memory allocation and I/O resource allocation are considered in a low memory killer process solution of an Android® system of Google®. However, these solutions have an undesirable effect of shortening a time of cold starting up an application, and even in some application scenarios, these solutions may slow down cold startup of an application, and consequently the terminal needs a longer time to display an interface of the application on a screen.

SUMMARY

In view of this, embodiments of the present invention provide a method, an apparatus, and a terminal for cold starting up an application. A group of optimization policies are more accurately and pertinently determined by analyzing information in a plurality of dimensions such as a use scenario of the terminal, current load of an operating system of the terminal, and system overheads for cold starting up the application. By using these optimization policies together, the terminal can complete the cold startup of the application more quickly.

According to a first aspect, an embodiment of the present invention provides a method for cold starting up an application. The method includes: collecting, by a terminal, current status information based on a detected startup event, where the startup event instructs an operating system of the terminal to cold start up an application, and the current status information includes a hardware configuration of the terminal, current load of the operating system, resource overheads for cold starting up the application, and duration corresponding to each of a plurality of tasks in a process of cold starting up the application; determining, based on the current status information, a group of acceleration items corresponding to the application, where the group of acceleration items indicate a plurality of objects that need to be optimized in the current process of cold starting up the application; determining a plurality of optimization policies corresponding to the group of acceleration items, where the plurality of optimization policies include at least one of a first optimization policy or a second optimization policy, the first optimization policy instructs to adjust a resource allocated by the operating system to the cold startup, and the second optimization policy is used to accelerate a task in the cold startup; and executing the plurality of optimization policies in the process of cold starting up the application.

In this way, the acceleration item (s) in the cold startup process is determined by analyzing information in a plurality of dimensions such as a use scenario of the terminal, current load of the operating system of the terminal, and system overheads for cold starting up the application, so that the group of optimization policies are more accurately and pertinently determined based on the acceleration item (s). By using these optimization policies together, the process of cold starting up the application can be optimized more comprehensively. Therefore, the terminal can complete the cold startup of the application more quickly. In other words, different optimization policies are used for terminals with different hardware configurations, operating systems in different working statuses, and different applications. Such optimization can more effectively accelerate the cold startup of the application.

The plurality of objects include at least one of a resource or a task. The resource includes a hardware resource and a software resource (that is, how to use the hardware resource). The hardware resource includes at least one of a processing resource, a storage resource, or a network resource. The software resource is used to indicate management performed by the operating system on a process, for example, a time when a process is allowed to use the hardware resource and a quantity of hardware resources that are allowed to be used at the time. The software resource includes management performed by the operating system on another active process, for example, at least one of freezing or clearing the another active process, releasing memory space occupied by the another active process, or releasing a lock occupied by the another process, to allocate the released resource to the process of cold starting up the application.

In an embodiment, the hardware configuration of the terminal includes specifications of a processor (for example, at least one of a central processing unit, a graphics processing unit, or a coprocessor), a storage device and a network device, of the terminal.

When the terminal cold starts up the application for the first time, both the resource overheads for cold starting up the application and respective duration for performing a plurality of events and a plurality of operations in the process of cold starting up the application are of preset values; or when the terminal cold starts up the application for the first time, both the resource overheads for cold starting up the application and respective duration for performing a plurality of events and a plurality of operations in the process of cold starting up the application are of historical values.

This is a process in which the operating system analyzes the collected current status information. The analyzing may be specifically performed based on determining logic and a threshold that are stored in the operating system. A correspondence between evaluation information and an acceleration item may be stored in at least one of a framework layer or a kernel library layer, and the correspondence between the evaluation information and the acceleration item may be that information of each dimension at a different level is corresponding to a group of acceleration items.

In a possible embodiment, the determining, based on the current status information, a group of acceleration items includes: analyzing the current status information, to obtain evaluation information currently corresponding to the application, where the evaluation information currently corresponding to the application includes a level of the hardware configuration of the terminal, a degree of the current load of the operating system, a type of the resource overheads of the application, and a long-time-consuming task in the cold startup; and determining, based on the evaluation information currently corresponding to the application and a correspondence between evaluation information and an acceleration item, the group of acceleration items currently corresponding to the application.

This is a process of analyzing the collected current status information.

For the hardware configuration, the terminal is determined as a high-end machine, a mid-range machine, or a low-end machine according to a specific hardware specification. For the load of the operating system, a load level of the operating system such as light, moderate, and heavy, or level-1, level-2, level-3, and level-4 may be determined based on collected information of the load of the operating system.

It should be understood that in a process of evaluating the load of the operating system, usage of one or more resources used by the operating system, namely, load of a plurality of hardware resources and software resources may be evaluated first, and then, the load level of the operating system may be evaluated based on evaluated load levels of the resources. In another embodiment, the load level of the operating system is directly determined based on the collected current status information.

In a possible embodiment, the determining, based on the evaluation information currently corresponding to the application and a correspondence between evaluation information and an acceleration item, the group of acceleration items currently corresponding to the application includes: when the hardware configuration of the terminal is of a first level, the operating system is currently in first level load, the application is of a first resource overheads type, and the long-time-consuming task in the cold startup belongs to a first group of tasks, determining that the application is currently corresponding to a first group of acceleration items; or when the hardware configuration of the terminal is of a second level, the operating system is currently in second level load, the application is of a second resource overheads type, and the long-time-consuming task in the cold startup belongs to a second group of tasks, determining that the application is currently corresponding to a second group of acceleration items.

Two items in at least one of a pair of the first level and the second level, a pair of the first level load and the second level load, a pair of the first resource overheads type and the second resource overheads type, or a pair of the first group of tasks and the second group of tasks are different. For example, the first level and the second level may be different levels, and two items in any of the other three pairs are the same. Certainly, two items in any of the four pairs may alternatively be different. The first group of acceleration items and the second group of acceleration items are two different groups of acceleration items. In other words, in some scenarios, when hardware levels and/or load levels are different, obtained acceleration items are also different even if a same application is cold started up.

In other words, when different levels are obtained by analyzing at least one type of information in the current status information, the different levels are corresponding to different groups of acceleration items.

In a possible embodiment, the determining a plurality of optimization policies corresponding to the group of acceleration items includes: determining, based on the group of acceleration items currently corresponding to the application and a correspondence between an acceleration item and an optimization policy, the plurality of optimization policies corresponding to the group of acceleration items.

The terminal stores the correspondence between the acceleration item and the optimization policy, and the correspondence may be specifically represented by using a plurality of tables, a linked list, or the like.

In a possible embodiment, the current load of the operating system indicates current usage of a hardware resource of the terminal that is used by the operating system, and the hardware resource includes at least one of a processing resource, a storage resource, or a network resource; and the resource overheads for cold starting up the application indicate usage of at least one of a processor, a memory, a disk, or network bandwidth of the terminal in the cold startup.

In a possible embodiment, in the process of cold starting up the application, the plurality of tasks include at least one first task and at least one second task, and the duration corresponding to the plurality of tasks includes respective duration for performing the at least one first task and respective duration for waiting for performing the at least one second task.

In a possible embodiment, the first optimization policy includes adjusting the at least one of the processing resource, the storage resource, or the network resource that are allocated to the cold startup.

In a possible embodiment, the first optimization policy includes: boosting an operating frequency of a central processing unit (CPU) of the terminal, prolonging a time of the CPU frequency boost of the terminal, adjusting an energy consumption parameter of the CPU of the terminal, migrating the process of cold starting up the application to a kernel of another CPU for execution, releasing memory space corresponding to the cold startup process of the application in advance, freezing or clearing at least one another process, and adjusting read/write bandwidth or network bandwidth that is allocated to the at least one another process, where the at least one another process is a process corresponding to at least one application, other than the application, that is run in the operating system; and the second optimization policy includes at least one of the following optimization policies: enabling a Nagle algorithm on a transmission control protocol (TCP) connection corresponding to the application, preferentially using the processing resource by a relatively important thread in the process corresponding to the cold startup, reading a file page required for cold starting up the application in advance, performing class verification in advance, decoding a picture in advance, or loading a basic database in advance.

It can be learned that after a plurality of types of current status information are comprehensively considered, the group of optimization policies based on the current operating system and features of the application are obtained. These optimization policies include scheduling of a resource and acceleration of a specific task, and are more targeted and comprehensive.

According to a second aspect, this application provides an apparatus for cold starting up an application. The apparatus includes: a collection module, where the collection module is configured to collect current status information based on a detected startup event, the startup event instructs an operating system of the terminal to cold start up an application, and the current status information includes a hardware configuration of the terminal, current load of the operating system, resource overheads for cold starting up the application, and duration corresponding to each of a plurality of tasks in a process of cold starting up the application; an analysis module, where the analysis module is configured to determine, based on the current status information, a group of acceleration items corresponding to the application, and the group of acceleration items indicate a plurality of objects that need to be optimized in the current process of cold starting up the application; an optimization policy determining module, where the optimization policy determining module is configured to determine a plurality of optimization policies corresponding to the group of acceleration items, the plurality of optimization policies include at least one of a first optimization policy or a second optimization policy, the first optimization policy instructs to adjust a resource allocated by the operating system to the cold startup and the second optimization policy is used to accelerate a task in the cold startup; and an execution module, where the execution module is configured to execute the plurality of optimization policies in the process of cold starting up the application.

According to a third aspect, an embodiment of the present invention provides a device, where the device includes a physical circuit, a communications interface, and a storage medium. The storage medium stores a protocol stack program, the communications interface is configured to send/receive a data packet to/from another device by executing the protocol stack program, and the processor is configured to run an instruction in the storage medium, so as to implement the method for cold starting up the application in the first aspect and various embodiments of the first aspect.

In an embodiment, the device is a terminal.

It should be understood that the second aspect and the third aspect respectively describe the apparatus and the device corresponding to the first aspect. For specific embodiments, descriptions, and technical effects of the second aspect and the third aspect, refer to the first aspect. Details are not described herein again.

According to a fourth aspect, a computer program product is provided. The computer program product stores program code that can be used to implement the method in any one of the first aspect and various embodiments of the first aspect.

According to a fifth aspect, a computer readable storage medium is provided. The computer readable storage medium includes an instruction. When the instruction is run on a computer, the computer is enabled to perform the method in any one of the first aspect and various embodiments of the first aspect.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and persons of ordinary skill in the art may derive other drawings from these accompanying drawings without creative efforts.

DESCRIPTION OF EMBODIMENTS

Figure 1:
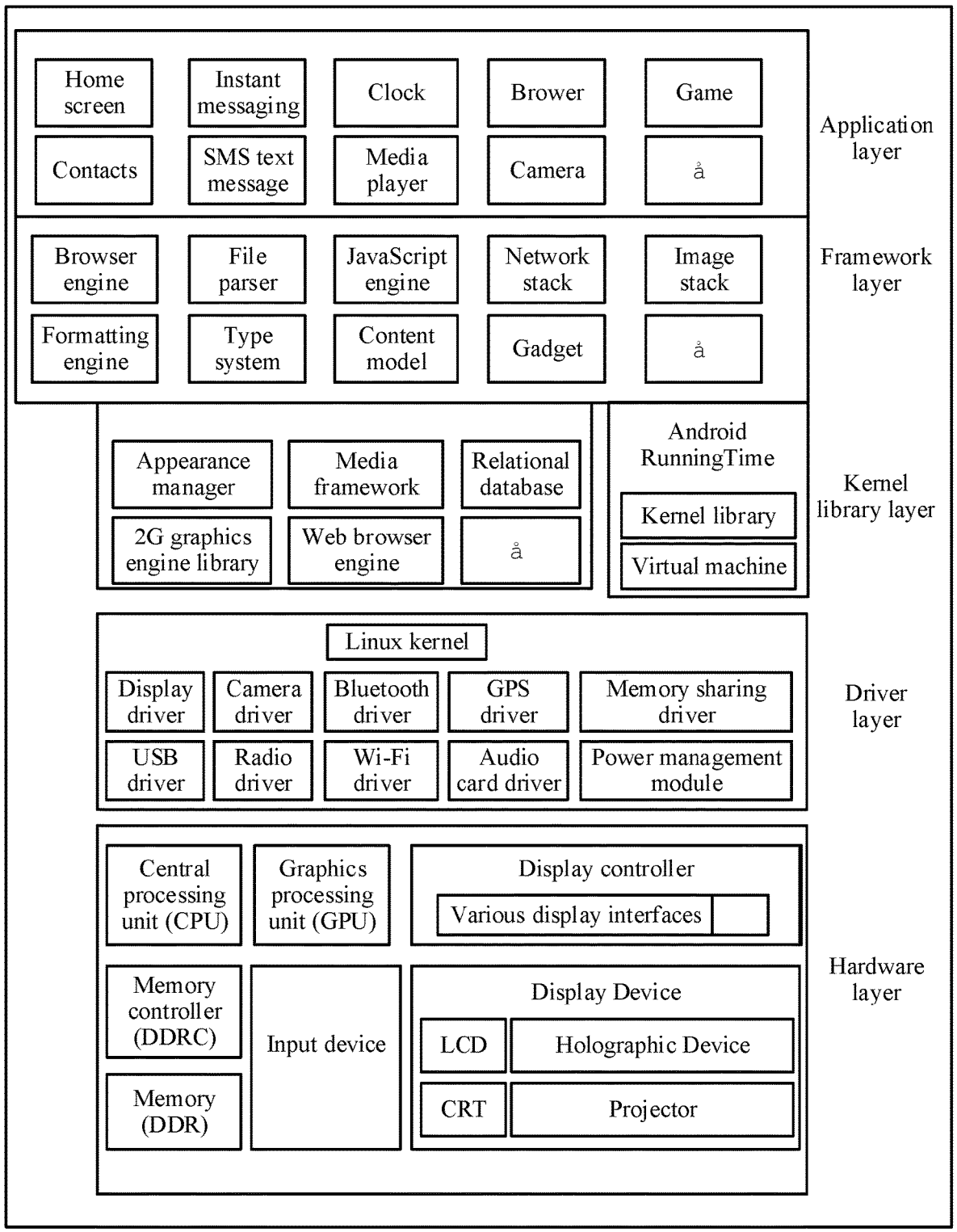
FIG. 1 is a schematic diagram of a terminal architecture according to an embodiment of the present invention.

Embodiments of the present invention provide a method, an apparatus, and a terminal for cold starting up an application. The following clearly describes the technical solutions in the embodiments of the present invention with reference to the accompanying drawings in the embodiments of the present invention. All other embodiments obtained by persons of ordinary skill in the art based on the embodiments of the present invention without creative efforts shall fall within the protection scope of the present invention.

The following describes some terms in this application.

A and/or B: A and/or B represents A and B, or A or B.

Kernel mode: A kernel mode is a process running in kernel address space, and the process running in the kernel address space may also be referred to as being in the kernel mode.

User mode: A user mode is a process running in user address space, and the process running in the user address space may be referred to as being in the user mode.

Task: A task is a basic work unit that is completed by a physical machine in a multi-program or multi-process environment. The task is one or more instruction sequences processed by a control program.

Running: Running is a type of thread state. It indicates that a thread is running on a CPU.

Runnable: Runnable is a type of thread state. It indicates that all conditions required for thread running are met, and a thread is queuing in a CPU running queue and is waiting for CPU scheduling, in other words, waiting for using the CPU.

Uninterruptable sleep: Uninterruptible sleep is a type of thread state, and is referred to as sleep for short. It indicates that a thread is in an uninterruptible blocking state. In this state, the thread is waiting for various lock resources.

WakeKill: WakeKill is a type of thread state. It indicates that a thread is in an uninterruptible blocking state, and is blocked by a critical signal, and is generally waiting for reading or writing a disk.

Block I/O: Block I/O is an input/output of a disk of a block device, in other words, reading/writing of the disk.

Inflate: Inflate represents a process of generating a corresponding view (view) based on a context and a parameter of a resource file in an Android system.

DDR: DDR is double data rate synchronous dynamic random access memory (DDR SDRAM), and is a type of memory.

VerifyClass: In an Android™ system, VerifyClass is a process in which some classes of an application cannot be verified during compilation due to some reasons, but are verified during application running. For example, after a hot patch function is used in this application, this process easily occurs.

Blocking: Blocking is to suspend a specific thread to wait for a condition. The condition can be that a specific resource is prepared.

Process killer: Process killer is to end a process or release a resource (such as a memory, a CPU, I/O, and a lock) occupied by a process.

Cold startup of an application is divided into three phases: preparation before cold startup of an application process, application initialization, and display of an application that is cold started up on an interface of a terminal. An intuitive description is a process from a time when a user taps a screen or a specific button, or when a user says a speech to the terminal, to a time when an application interface is completely displayed to the user.

In an embodiment, the preparation before the cold startup of the application includes: reception that is performed by the terminal and that is of a touchscreen event input by the user, and a series of triggered processing. For example, the touchscreen event enables an operating system of the terminal to identify that an application is required to be cold started up. The series of processing includes identifying the touchscreen event, where the event is delivered, by using an input daemon process, to a launcher's onClick( ) function of a launcher progress, and further includes foreground/background switching. Specifically, the launcher progress requests a system service process to perform process initialization, window initialization, and the like on a to-be-started up application, and then the system server switches an application running on the launcher to a background application, and sets the to-be-started up application as a foreground application.

Application initialization includes initialization of a common component of the application, and initialization of a service and data that are required for a process used to run the application. The common component may include at least one of a network request library, a JavaScript object notation (Json) parser, a big data statistics library, or an application encryption library.

Displaying of the started up application on the interface of the terminal includes operations such as loading of data that needs to be displayed and laying out and drawing of the interface, for example, downloading a text, a picture, or a video from a network, decoding a picture, and reading a database in which the to-be-displayed data is located.

The operating system cold starts up the application by using a process. One process includes one or more threads, for example, a component loading thread and a main thread. The cold startup process requires cooperation of threads in the process, so that tasks in the foregoing several phases are performed in a specific sequence, and resources of the terminal need to be consumed. The tasks in the foregoing several phases may affect a time for cold starting up the application. In an existing solution for accelerating the cold startup of the application, several fixed manners are usually used to accelerate the cold startup. For example, only a CPU frequency boost manner or a manner in which a process is killed for releasing memory space is used. These manners are not used to pertinently optimize performance of the cold startup of the application, in many cases, may deteriorate performance of the cold startup of the application.

A time consumed by cold startup of one application may be referred to as a startup delay. The startup delay is an accumulation of duration corresponding to each of a plurality of tasks in a process of cold starting up the application. Relatively large impact on the startup delay is caused by delays of execution of some long-time-consuming tasks, and resource (including a software resource and a hardware resource) contention between a plurality of threads of the process. The startup delay may include at least one of a CPU delay, a memory slow path delay, a zram compression delay, an I/O delay, a network delay, a delay caused because a thread in a sleep state waits for a lock (i.e., sleep lock delay), a delay of a thread in a runnable state, or a delay of a thread that is caused by thread blocking (for example, the component loading thread blocks the main thread) on one or more threads in the process of executing the application.

CPU delay: A CPU delay is duration during which a thread is waiting for using a CPU, in other words, is duration during which the thread keeps in a runnable state.

Memory slow path delay: A memory slow path delay is a time consumed by a thread to use the memory through a slow path. Memory space read by the slow path is memory space that is released by a device according to a read/write instruction and that is occupied by another application or process.

Zram compression delay: A zram compression delay is a time used by a thread to read compressed data in the memory. Zram, also referred to as zip RAM, is a function of a Linux kernel and may be used for virtual memory compression. To store more data in the memory, some addresses in some memory space may store compressed data, and the data needs to be decompressed before being read.

I/O delay: An I/O delay is a time consumed by a thread to execute a batch of disk read/write instructions. The I/O delay is mainly caused by a waiting time of these instructions in a queue. In the cold startup process, data, for example, a user interface, user data, and a local cache of the application, required for cold starting up the application needs to be read. Therefore, the CPU may deliver disk read/write instructions in batches. An operating system of the terminal always has disk read/write instructions from all threads, and these instructions are placed in a queue. Because the disk read/write instructions triggered by the cold startup of the application are delivered in batches, execution of the instructions can be completed only after the instructions wait in the queue for a period of time. Generally, the I/O delay accounts for about 15% of duration for cold starting up the application.

The method for cold starting up an application described in this application is applied to a terminal, and the terminal is a device in which an application can be installed and that is provided for a user to use. The terminal obtains, from a plurality of dimensions through current status collection, current status information related to the cold startup of the application, to analyze, based on the collected current status information, a problem facing acceleration of the cold startup of the application in this specific scenario (to be specific, to obtain a group of acceleration items). In addition, an optimization policy corresponding to the determined acceleration items may be obtained based on the determined acceleration items, and a policy for the specific problem is used to optimize the cold startup process of the application, so as to reduce a time of cold starting up the application, and more properly allocate the software resource and the hardware resource of the terminal, thereby improving user experience.

The terminal may store one or more optimization policy libraries, and each optimization policy library stores a plurality of optimization policies. In terms of the hardware resource, the optimization policy may be adjusting the hardware resource as required. An adjustable manner includes at least one of the following: boosting an operating frequency of a CPU, binding a process that executes the application to a specific CPU core or reallocating a CPU core that is used to execute the application, adjusting an operating frequency of an L3 cache, adjusting an operating frequency of a GPU, adjusting a power management (e.g., always-on) parameter, and adjusting both an operating frequency of the CPU and an operating frequency of the DDR to enable the adjusted operating frequency of the CPU and the adjusted operating frequency of the DDR to still match each other. In terms of accelerating the task in the cold startup, the optimization policy may include: scheduling a VIP thread if a runnable state of a key thread is long, performing page-level file pre-fetching if the I/O delay is relatively long, using the TCP protocol to transmit a packet with no-delay if the network delay is long, performing page fault lock degradation if an uninterruptable sleep state is long, and using another process to perform, in advance, a task that takes a relatively long time. The task may be at least one of function compiling, picture decoding, class verification, SO library loading, TCP pre-connecting, and the like.

The following describes specific meanings of some optimization policies.

CPU boost: CPU boost is used to improve CPU processing performance. Common technical means are CPU frequency boost and CPU core affinity. The CPU frequency boost is to boost an operating frequency of a CPU to a maximum value or a relatively large value in an operating frequency range. The CPU core affinity is to bind some applications to some cores, of the CPU, with relatively high configurations to ensure that these applications can be allocated with more processing resources. It should be understood that the CPU may work within a frequency range. In consideration of a service life and power consumption, generally, the CPU works at an intermediate value or a relatively small value in the frequency range. In addition, the terminal may have a default CPU frequency boost time, in other words, duration, for example, 1.5 s, during which an operating system adjusts the CPU to work at a relatively high frequency after receiving a CPU frequency boost instruction.

VIP thread scheduling: VIP thread scheduling means that some of threads that are queuing in a processor running queue and waiting for being executed by a processor are enabled to jump the queue. In other words, the some threads are executed in advance, for example, the some threads are jumped to the front of a queue. Alternatively, VIP thread scheduling means that some of the threads are switched from one processor core to another processor core for running, and the some threads may be relatively important threads that are sorted based on priorities, or may be one or more preset types of threads. The another processor core to which the threads are switched to is a processor core with a relatively light load, a relatively short waiting time, or in an idle state.

Process fast killer: Process fast killer means that when a KILL_SIG used to terminate a process is received, memory space is released only after a reference count of a virtual memory that is shared by a thread of the process in a running state is reduced to 0. In addition, the shared virtual memory is adjusted to memory space of an anonymous page and memory of a file page that are first released. The KILL_SIG is a signal that is sent to a process and that terminates the process immediately. The process fast killer can resolve a problem of large memory pressure, so as to quickly release the memory space.

Page fault lock degradation: Page fault lock degradation is a dynamic memory allocation technology. Specifically, page allocation is delayed until a page to be accessed by a process is not in a physical memory, causing a speculative page fault. For example, in a page fault process, a process-level mm semaphore is no longer used. Instead, a thread-level lock with a finer granularity is used. A process of changing from the process-level lock to the thread-level lock is the lock degradation. This optimization policy can provide better parallel performance in the process.

Page-level file pre-fetching: Page-level file pre-fetching means that file pages that need to be read in a cold startup process are identified in advance. In the cold startup process, the pages are pre-fetched, in advance, from a cache by using another process without pre-fetching an entire file in which the pages are located. Specifically, the optimization policy of the terminal may reduce I/O waiting time of startup time.

Using the TCP protocol to transmit a packet with no-delay: Using a TCP protocol to transmit a packet with no-delay is also referred to as transmitting a packet by using TCP with no-delay, and is applied to a scenario in which interaction needs to be performed with a network side by using the TCP protocol or the MPTCP protocol in a cold startup process of an application. Specifically, in the cold startup process of the application, a Nagle algorithm in the TCP protocol is enabled. With use of this algorithm, a packet transmission delay is small, and there is no need to wait for another packet, thereby saving a packet transmission time.

Picture pre-decoding, SO library pre-loading (where .so is a type of file extension), and function pre-compiling are all necessary pre-processing that needs to be performed on to-be-used data in advance in a cold startup process. The pre-processing is performed by another process after the operating system detects a startup event. Generally, when the another process performs the pre-processing, the process used to cold start up an application is still being constructed. This manner can ensure that when the process used to cold start up the application needs to use the data, the process does not need to wait for processing or reading the data.

Picture pre-decoding: Picture pre-decoding means that before cold startup, a group of pictures that need to be decoded in the cold startup are identified, and after a startup event is detected, another process is used to decode these pictures. For example, these pictures may be determined based on a historical cold startup process of the application.

SO library pre-loading: SO library pre-loading means that before cold startup, SO library information that needs to be loaded in the cold startup is identified. In the cold startup, another thread is used to load the information in advance. The SO library stores .so files in an Android™ system.

Function pre-compiling: Function pre-compiling means that functions or code blocks for which a long precompiling time is taken or that are run frequently in a cold startup process are identified based on a historical cold startup process, and these code blocks are precompiled in advance at the background. Specifically, a just-in-time (JIT) compiler in a virtual machine may be used to determine code blocks that are run frequently. These code blocks that are run frequently are also referred to as hot spot codes.

Background application freezing: Background application freezing means that an application that is still running at the background is frozen by using a freezer mechanism of cgroup in cold startup of an application, in other words, freezing a process that runs the background application, for example, forbidding the process accessing a memory or occupying a CPU and unfreezing the process after the cold startup of the application is complete. This optimization policy can reduce impact of the application that is run at the background on cold startup duration when a system is heavily loaded.

Application management and control sorting: Application management and control sorting means that process lists, such as a killable process list, a compressible process list, and a non-killable process list, that can be managed and controlled at the background are generated based on priorities of services corresponding to a plurality of processes that are run in a current operating system. These process lists can be used with some of the foregoing optimization policies.

File cache classification mechanism: A file cache classification mechanism is used to classify and manage caches of files used in a cold startup process. The classification management file cache is implemented by classifying least recently used (LRU) queues. Specifically, a relatively important file cache is added in an LRU queue with a higher priority, and the other file caches are added in an LRU queue with a lower priority. When a file cache is deleted, a cache in the LRU queue with the lower priority is first deleted.

The foregoing plurality of optimization policies are merely examples, and optimization policies that may be used in the method described in this application are not limited to the foregoing types.

The following describes in detail the method for cold starting up an application from a plurality of aspects.

In this application, the terminal is a physical machine, and may also be referred to as user equipment (UE), a mobile station (MS), a mobile terminal, or the like. Optionally, the terminal may have a capability of communicating with one or more core networks by using a radio access network (RAN). For example, the terminal may be a mobile phone (or referred to as a "cellular" phone), or a computer with a mobile property. For example, the terminal may alternatively be a portable, pocket-sized, handheld, computer built-in, or in-vehicle mobile apparatus, such as a mobile phone, a tablet computer, a notebook computer, a palmtop computer, an intelligent wearable device, or a mobile Internet device (MID). It should be understood that, in addition to the terminal, the method provided in the embodiments of the present invention may be further applied to another type of computer system.

Load of the operating system of the terminal may also be referred to as a running state of the operating system, and indicates usage of a hardware resource of the terminal by software of the terminal. Current load of the operating system of the terminal includes current load of the operating system and resource overheads of an application that is currently run in the operating system. The hardware resource includes but is not limited to at least one of a CPU, a memory (for example, a DDR), a disk, a network, or a GPU. For example, a process of the application reads data from the memory, the disk, or the network by using the CPU or the GPU. The hardware resource and how to use the hardware resource may be described by using a plurality of parameters. This is not limited in this application. For example, parameters related to the disk are a capacity of a local disk, a local disk read/write speed, local disk I/O wait (e.g., I/O wait), and the like, and parameters related to the network are network bandwidth, a network delay, and the like.

In one embodiment, the load of the operating system is described at least from usage of three resources: the CPU, the memory, and the disk. The terminal may determine a status of the operating system based on real-time data of the three resources used by the operating system. Each of the foregoing three aspects may be described by using different parameters, for example, CPU load, available memory space, and I/O wait. The CPU load refers to utilization of the CPU, and the available memory space may be an available memory size, or may be a proportion of the available memory size to a total memory size. For another example, the I/O wait may be described by using duration of the I/O wait, or may be described by using a quantity of parallel I/O channels. In a Linux-based operating system, there is a dedicated instruction for obtaining values of the foregoing three parameters. Certainly, the load of the operating system may alternatively be described by using a parameter related to another resource. This is not limited in this application. For example, if a to-be-cold started-up application needs to download data from a network device side, a network resource such as a network signal strength, network bandwidth, and a current data transmission status of the terminal need to be further considered. The terminal may access a network by using an access node of a wireless network or an access node of a wired network. For example, the access node may be an access point (AP) of a wireless Wi-Fi network, an Ethernet router, an access point of a Winmax™ network, or a base station of a wireless cellular mobile network. A type of the network and a specific form of the access node are not limited in the present invention.

After analyzing the obtained values of the foregoing three parameters, the operating system may determine usage of the current system in terms of the CPU, the memory, and the disk, so as to determine the status of the operating system. An analysis result may be compared with a preset threshold. For example, if CPU load exceeds a first threshold, it is considered that the CPU load is high; if CPU load is between a first threshold and a second threshold, it is considered that the CPU load is moderate; and if an available memory size is less than a specific proportion, it is considered that available memory space is small.

In an embodiment, the status of the operating system is classified into several levels, for example, three levels, namely, light, moderate, and heavy. The operating system may directly determine the status of the operating system based on the obtained values of the foregoing three parameters, or may determine the status of the operating system based on the levels corresponding to the values of the three parameters. For example, an operating system with high CPU load, a small available memory size, and high I/O wait is in a heavy load state.

In an embodiment, resource overheads for cold starting up the application are also described based on usage of the three resources: the CPU, the memory, and the disk. The resource overheads are also referred to as startup overheads of the application for short, namely, processing resource overheads (for example, CPU overheads), memory overheads, and I/O overheads. All the three aspects may be represented by using different parameters. The CPU overheads are CPU resources occupied by the process to cold start up the application, for example, may be represented by a percentage of the CPU resources to total CPU resources. The memory overheads are memory space used by the process to cold start up the application, and may be represented, for example, by a percentage of a size of the memory space to a total memory size, or may be represented by a used memory size. The I/O overheads are an amount of disk data that needs to be read or written by the process to cold start up the application. The operating system may also store some thresholds for the operating system to analyze values of the foregoing three types of overheads. For example, if the CPU overheads exceed a threshold, it is considered that CPU overheads of the cold startup process of the application are high. It should be understood that the startup overheads of the application may also be indicated by using a combination of other resources, for example, at least one of a processor, a memory, a disk, or network bandwidth.

Figure 2A:
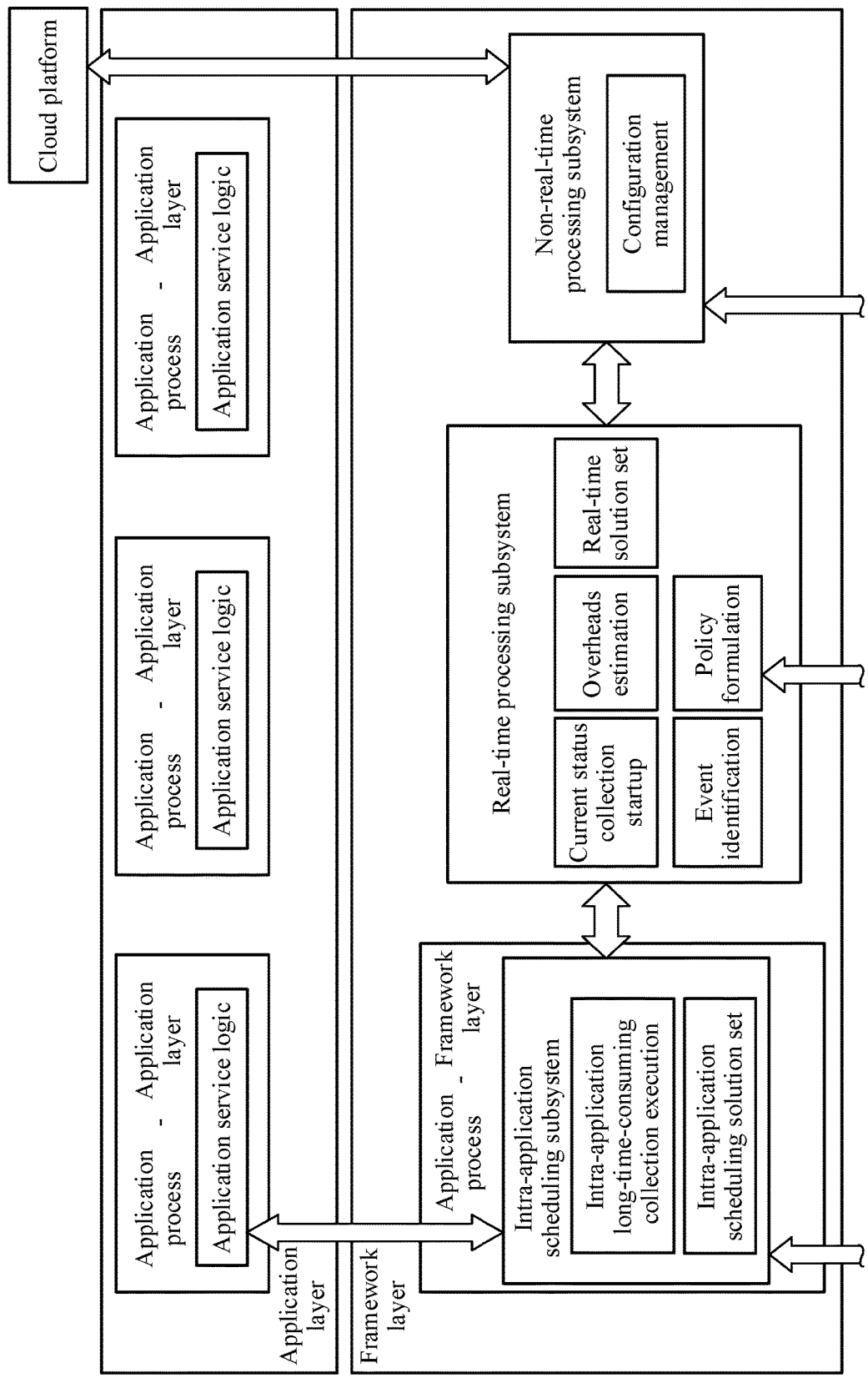
FIG. 2A and FIG. 2B are schematic diagrams of a software architecture of a terminal according to an embodiment of the present invention.
Figure 2B:
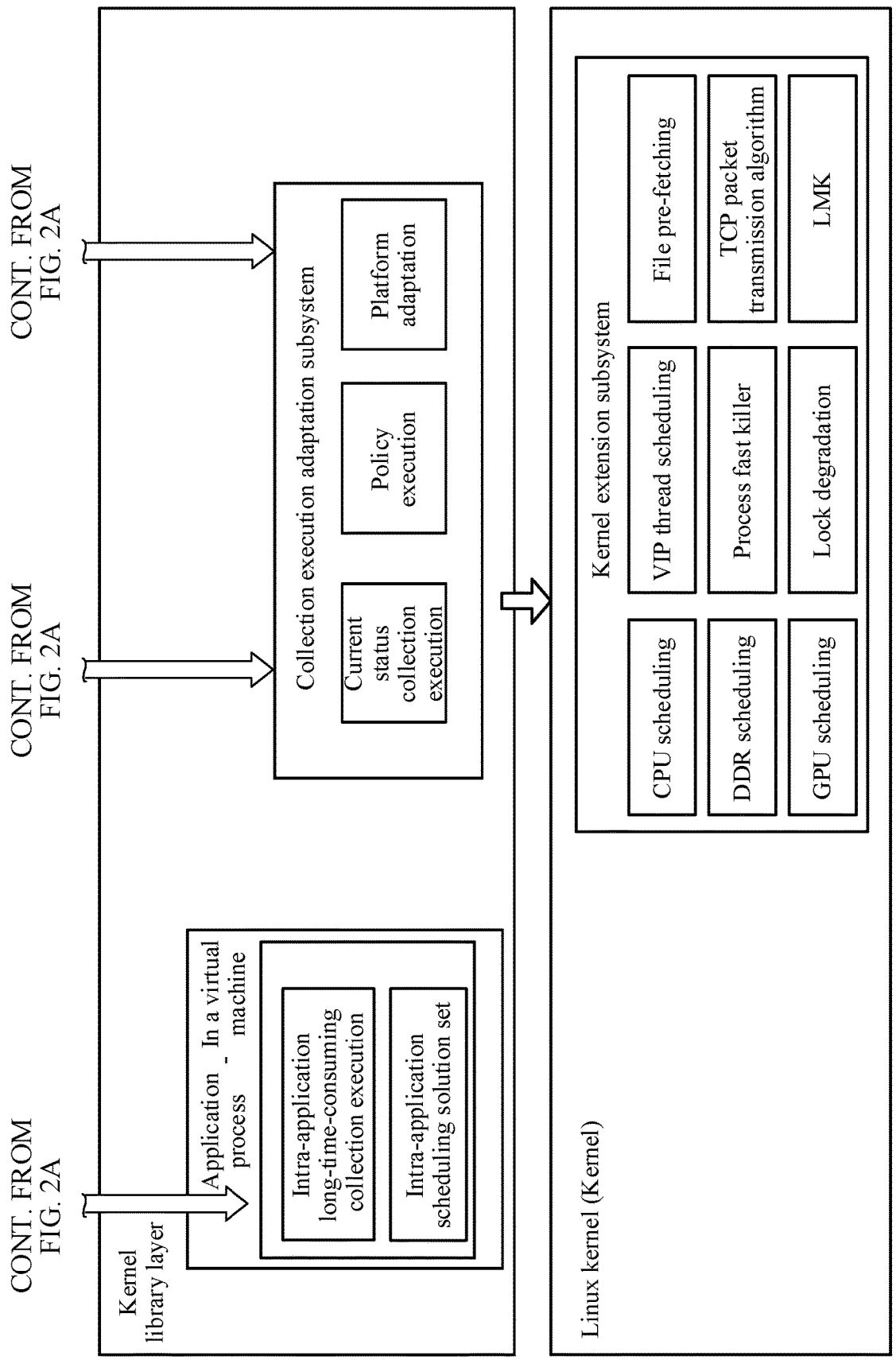

FIG. 1 is a schematic structural diagram of a terminal 100 according to an embodiment of the present invention. The terminal 100 may be a device in this embodiment of the present invention. Some modules that may be included at a software layer and a hardware layer of the terminal are schematically drawn in the figure. The software layer of the terminal includes a driver layer, a kernel library layer, a framework layer, and an application layer. The driver layer may include a CPU driver, a GPU driver, a display controller driver, and the like. A kernel of an operating system (for example, a kernel of an Android™ system) is also located at the driver layer. It should be understood that FIG. 1 is merely possible schematic layer division, and some layers may have different names in division in another manner. For example, another schematic diagram FIG. 2A and FIG. 2B show another division manner. The driver layer in FIG. 1 is referred to as a Linux kernel in FIG. 2A and FIG. 2B, and the Linux kernel includes the drivers described at the driver layer in FIG. 1.

The kernel library layer is a core part of the operating system, and includes an appearance manager, a media framework, a relational database, a 2G graphics engine library, a web browser engine, a kernel library, a virtual machine (for example, Dalvik Virtual Machine), and the like. In addition, the framework layer may include a browser engine, a layout engine, a file parser, and the like. The application layer may include a plurality of application programs such as a home screen, a media player, and a browser.

The hardware layer of the terminal includes a Center Processing Unit (CPU), a Graphics Processing Unit (GPU), and the like, and certainly, may further include a storage, an input/output device, a memory, a memory controller, a network interface, and the like. The input device may include a keyboard, a mouse, a touchscreen, and the like. The output device may include a display device such as a Liquid Crystal Display (LCD), a Cathode Ray Tube (CRT), a holographic imaging device, or a projector. An operating system (such as Android™ or Firefox™ OS) and some application programs may be run above the hardware layer.

The system architecture shown in FIG. 1 may be used to perform the method described in this application, and FIG. 2A and FIG. 2B describe locations of various subsystems that may be used to perform the method described in this application in another system architecture. This system architecture is similar to the system architecture described in FIG. 1. FIG. 2A and FIG. 2B include a software layer of a terminal. The software layer includes a Linux kernel (kernel), a kernel library layer, a framework layer, and an application layer. In FIG. 2A and FIG. 2B, a double-headed arrow is used to represent data exchange. An intra-application scheduling subsystem, a real-time processing subsystem, a collection execution adaptation subsystem, a kernel extension subsystem, and a non-real-time processing subsystem shown in FIG. 2A and FIG. 2B are improvement parts of an existing terminal operating system related in this application in some embodiments.

An application process is used to run an application. One application process relates to an application layer and a framework layer. If one application is run on a virtual machine, the application process further relates to a kernel library layer. Parts of one application process at different layers exchange information by using an interface. FIG. 2A and FIG. 2B show three application processes in an operating system, and shows parts, at three layers, of an application process that is on a left side and that is run on the virtual machine. The application process executes service logic of the application at the application layer. The intra-application scheduling subsystem includes a part in the framework layer and a part in the virtual machine, and may manage a plurality of applications in the system. The management includes implementing collection, identification, recording, and storage (namely, intra-application long-time-consuming collection execution in the figure) of an intra-application long-time-consuming condition and implementing an optimization policy that belongs to intra-application scheduling (the optimization policy is stored in an intra-application scheduling solution set). The application process is run on the virtual machine, and therefore the intra-application scheduling subsystem shown in FIG. 2A and FIG. 2B is distributed at both the framework layer and a virtual machine layer. The optimization policy of the intra-application scheduling subsystem in the solution set of the framework layer includes but is not limited to picture pre-decoding, class pre-verifying, TCP pre-connecting, and SO library pre-loading. In the solution set of the framework layer, the optimization policy includes but is not limited to: function compiling in advance and class loading in advance.

The framework layer includes the real-time processing subsystem and the non-real-time processing subsystem. The real-time processing subsystem is configured to implement functions such as current status collection, overheads evaluation, policy formulation, and event identification. These functions are also focuses of the method for cold starting up an application described in this application, and are further described in detail below with reference to a method procedure. For example, the current status collection function is corresponding to a collection module 401 in FIG. 4, and the overheads evaluation and the policy formulation are corresponding to an analysis module 402 in FIG. 4. A module corresponding to the event identification is not shown in FIG. 4. The subsystem also includes a real-time solution set, and some improvement solutions that belong to the framework layer are recorded in the solution set, for use of formulating an overall improvement policy. For example, a solution in the solution set may include: accelerating the CPU as required, and if the application that needs to be cold started up uses a large memory size, changing a memory allocation policy, to ensure memory use of the application.

The non-real-time processing subsystem stores a configuration and data related to the cold startup of the application, and the data may be stored in a disk. For example, the non-real-time processing subsystem stores historical data applied to cold startup of the application in different system load statuses, a default configuration of each sub-solution, a default parameter value, and an optimized parameter value obtained after the sub-solution is used. In an embodiment of an implementation process of a processing subsystem formulation policy, a configuration and data may be obtained from the non-real-time processing subsystem.

The core layer includes a collection execution adaptation subsystem and the part of the application process that belongs to the core layer. The collection execution adaptation subsystem is configured to process a policy formulated by the real-time processing subsystem, to enable the kernel extension subsystem to execute the policy. In an embodiment, the collection execution adaptation subsystem has relatively high permission. The collection execution adaptation subsystem includes a current status collection execution module, configured to provide a query interface for a current status collection module of an the real-time processing subsystem subsystem to use; a policy delivery module, configured to: receive a command of a real-time subsystem policy formulation module, and deliver the command to a kernel subsystem; and a platform adaptation module, configured to adapt to encapsulate an interface of a heterogeneous kernel node, for example, a resource such as a CPU or a GPU, into a unified interface, for being invoked by the real-time processing subsystem.

The driver layer includes the kernel extension subsystem, and the kernel extension subsystem is configured to, in the cold startup process of the application, execute policies formulated by the real-time processing subsystem. These policies may include one of CPU-or DDR-or GPU-related scheduling, VIP thread scheduling, a process fast killer, lock (such as PageFault) degradation, page-level file pre-fetching, a low memory killer (LMK), and using the TCP protocol to transmit a packet with no-delay.

It can be learned that the operating system maintains an analysis rule in which an acceleration item is analyzed based on the current status information. The operating system further maintains a mapping relationship between the acceleration item and the optimization policy. The mapping relationship may include at least one of a mapping relationship between a group of acceleration items and a group of optimization policies or a mapping relationship between one acceleration item and at least one optimization policy. A determined optimization policy may be a group of optimization policies directly obtained by using a group of the acceleration items. Alternatively, at least one optimization policy corresponding to each obtained acceleration item may be obtained for the obtained acceleration item, and all the obtained optimization policies are optimization policies to be executed in the current cold startup of the application. Alternatively, at least one optimization policy corresponding to each obtained acceleration item may be obtained for the obtained acceleration item, and some optimization policies are removed from all the obtained optimization policies according to a combination rule, to obtain an optimization policy to be executed in the current cold startup of the application.

In this way, the device shown in FIG. 2A and FIG. 2B may be configured to perform the method for cold starting up an application provided in this application. It can be learned that program code corresponding to the method in this application exists in operating system platform software. During running, program code of the present invention is run in a host memory of a server.

Figure 3:
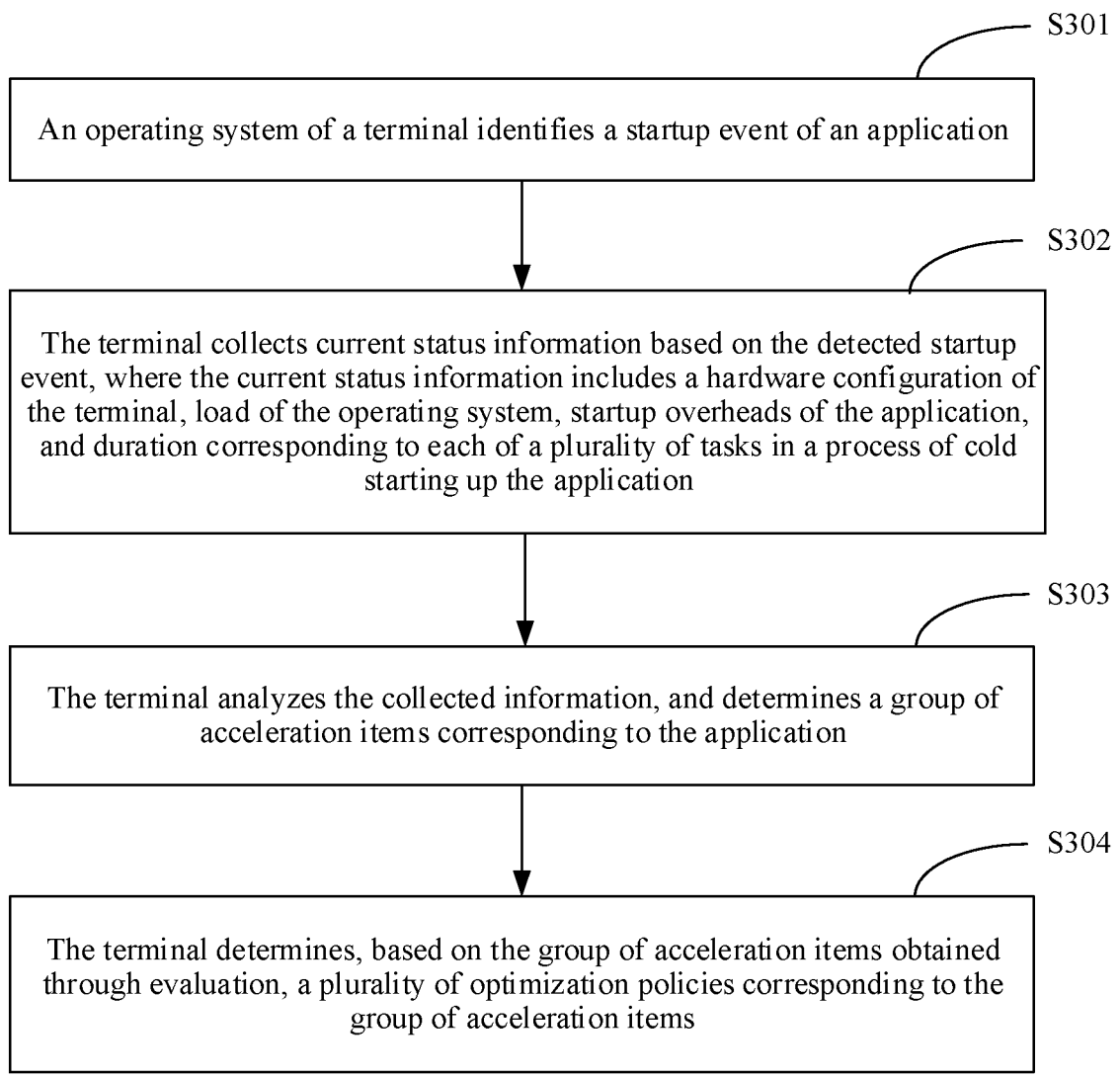
FIG. 3 is a schematic diagram of a method for cold starting up an application according to an embodiment of the present invention.

With reference to FIG. 3, the following describes, by using a mobile phone as an example, a method for cold starting up an application provided in this application. For explanations of various terms in the method, refer to corresponding paragraphs in this application. The embodiment corresponding to FIG. 3 is merely an example for description.

S301. An operating system of a terminal identifies a startup event of an application, where the startup event instructs the operating system of the terminal to cold start up the application.

For example, the event may be a tap performed by a user on a screen of the terminal, or a voice instruction sent by a user to the terminal, or an image received by the terminal, or a signal or a software instruction that can be recognized by the operating system of the terminal. An embodiment of the startup event is not limited in this application.

S302. The terminal collects current status information based on the detected startup event, where the current status information includes a hardware configuration of the terminal, load of the operating system, startup overheads of the application, and duration corresponding to each of a plurality of tasks in a process of cold starting up the application.

Resource overheads for cold starting up the application and the duration corresponding to each of the plurality of tasks in the process of cold starting up the application used in the method procedure described in this application are not of real-time values of the current cold startup, and may be of values that are of a cold startup process of the application and that are historically recorded by the terminal, or may be of default values stored by the terminal, or may be of values estimated by the operating system of the terminal. It should be understood that the startup overheads of the application vary with the load of the system. For example, in a high-load system state and a low-load system state, parameter values of startup overheads of a same application may be different. In an embodiment, the terminal stores startup load values of a same application in different statuses of the operating system, so that a more appropriate value is used to describe the startup load in a specific status of the operating system. In one cold startup process, the terminal may collect various parameters of startup load in the current cold startup process, and record a status of the operating system in the current cold startup process, for cold starting up the application in the future.

The hardware configuration of the terminal includes specifications of a plurality of hardware of the terminal, and the plurality of hardware includes at least one of a CPU, a DDR, a GPU, a memory, or a network resource. The hardware specifications can be represented by a plurality of parameters, such as a CPU frequency, a quantity of CPU cores, a DDR bandwidth frequency, a GPU frequency, a quantity of GPU cores, a memory disk read/write speed, a disk read/write speed, and a memory capacity.

The load of the operating system may be represented by parameters in terms of processor, storage, and a network, and may include at least one of CPU load, available memory space, I/O wait, or a network status of the system.

The startup overheads of the application are also referred to as overheads required for cold starting up the application, and the overheads include at least one of an average time, computing power million instructions per second (MIPS), CPU load, GPU load, occupied memory space, an I/O read/write amount, I/O read/write bandwidth, or a network reading amount for starting up each application.

When the application is not cold started up for the first time, duration corresponding to a plurality of tasks in the process is determined based on historical data for starting up the application on the mobile phone. The duration corresponding to the task may be duration for executing a specific task, for example, duration for executing any one of tasks such as class verification, function compiling, picture decoding, SO library loading, and TCP link establishment during running, or may be duration for waiting for executing a specific task, for example, at least one of a delay caused by waiting for use of the CPU, a memory slow path delay, a zram compression delay, an I/O delay, or a network delay on a main thread and another key thread. For the startup for the first time, a preset value or an estimated value may be used.

S303. The terminal analyzes the collected information, and determines a group of acceleration items corresponding to the application.

In an embodiment, the step includes: analyzing the current status information, to obtain evaluation information currently corresponding to the application, where the evaluation information currently corresponding to the application includes a level of the hardware configuration of the terminal, a degree of the current load of the operating system, a type of the resource overheads of the application, and a long-time-consuming task in the cold startup; and determining, based on the evaluation information currently corresponding to the application and a correspondence between evaluation information and an acceleration item, the group of acceleration items currently corresponding to the application.

The determining the acceleration items includes performing overheads evaluation, in other words, analyzing the current status information, to obtain the evaluation information currently corresponding to the application.

The overheads evaluation includes evaluating levels for the hardware configuration, the load of the operating system, the startup overheads of the application, and a scheduling delay and running time consumption of the application. The evaluation may include classifying various types of information and determining an event that affects a cold startup delay of the application. The following evaluation may be determined based on a preset threshold.

For the hardware configuration, the terminal is determined as a high-end machine, a mid-range machine, or a low-end machine according to a specific hardware specification.

For the load of the operating system, a load level of the operating system such as light, moderate, and heavy, or level-1, level-2, level-3, and level-4 may be determined based on collected information of the load of the operating system.

It should be understood that in a process of evaluating the load of the operating system, usage of one or more resources used by the operating system, namely, load of a plurality of hardware resources and software resources may be evaluated first, and then, the load level of the operating system may be evaluated based on evaluated load levels of the resources.

In another embodiment, the load level of the operating system is directly determined based on the collected current status information.

It can be learned that the terminal stores a rule used to evaluate the load of the operating system. For example, an operating system with high CPU load, a small available memory size, high I/O, and small available network bandwidth is in a heavy load state. Alternatively, if the CPU load is greater than a first threshold, and the available memory space is less than a second threshold, the system is in a heavy load state.

For the startup overheads of the application, that the application is of at least one of a CPU consumption type, a GPU consumption type, a memory consumption type, an I/O consumption type, or a network consumption type is determined based on resource consumption when the application is started up.

Identifying a long-time-consuming task for starting up the application is specifically identifying, based on historical data for starting up the application on the mobile phone, a key bottleneck of starting up the application in terms of a resource scheduling delay and an application running delay. In terms of the resource scheduling delay, the application may be determined as of at least one of a running queue waiting type, a memory allocation delay type, an I/O delay type, or the like based on historical scheduling delay information for starting up the application in a condition of current resource load (which may be represented by a load level) of the terminal. In terms of the application running delay, the application is determined as of at least one of a function compiling long-time-consuming type, a picture decoding long-time-consuming type, a layout long-time-consuming type, a class verification long-time-consuming type, a network waiting long-time-consuming type, or the like based on collected application startup long-time-consuming execution information.

The overheads evaluation further includes obtaining a corresponding group of acceleration items based on a result of the foregoing analysis. These acceleration items are used to indicate at least one of a resource or a task that needs to be adjusted in the current cold startup. Specifically, several items with a largest resource gap that are estimated for the current startup of the application are evaluated, according to a resource gap ranking, based on identified hardware, identified load of the operating system, and identified overheads of a to-be-started-up application of the mobile phone. Based on historical data of the to-be-started-up application on the mobile phone, several tasks with a largest scheduling gap are estimated and several tasks that need to be optimized during the cold startup according to a time ratio of the scheduling delay.

In an embodiment, when the hardware configuration of the terminal is of a first level, the operating system is currently in first level load, the application is of a first resource overheads type, and the long-time-consuming task in the cold startup belongs to a first group of tasks, the application is currently corresponding to a first group of acceleration items; or when the hardware configuration of the terminal is of a second level, the operating system is currently in second level load, the application is of a second resource overheads type, and the long-time-consuming task in the cold startup belongs to a second group of tasks, the application is currently corresponding to a second group of acceleration items.

S304. The terminal determines, based on the group of acceleration items obtained through evaluation, a plurality of optimization policies corresponding to the group of acceleration items.

The terminal stores the correspondence between the acceleration item and the optimization policy, and the correspondence may be represented by using one or more tables, a pointer, or a linked list. The correspondence may be stored in at least one of a framework layer, a Linux kernel, or a kernel library layer. The correspondence may be a correspondence between a plurality of groups of acceleration items and a plurality of groups of optimization policies. One group of acceleration items are corresponding to one group of optimization policies. Alternatively, the correspondence may be a correspondence between a plurality of acceleration items and a plurality of optimization policies, and one acceleration item is corresponding to one or more optimization policies. In this way, optimization policies corresponding to the group of acceleration items obtained through evaluation are searched for one by one, so that all the optimization policies corresponding to the group of acceleration items may be obtained. In this manner, operations such as necessary deduplication of same optimization policies and elimination of an optimization policy that is opposite to another optimization policy may be further included. The opposite optimization policies have opposite optimization directions. For example, an optimization policy 1 instructs the CPU to boost a frequency, and an optimization policy 2 instructs the CPU to reduce a frequency. These two optimization policies are opposite.

The plurality of optimization policies include at least one of a first optimization policy and/or a second optimization policy, where the first optimization policy instructs to adjust a resource allocated by the operating system to the cold startup, and the second optimization policy is used to accelerate a task in the cold startup.

Specifically, the determined optimization policy may be invoked from an existing library, or may be obtained by modifying, based on collected current status information, a parameter in an existing policy.

For descriptions of a determining manner of the optimization policy and a type of the optimization policy, refer to the foregoing related paragraphs. Only a simple example is used herein for description.

In terms of the resource, the optimization policy may be adjusting a parameter of the hardware resource as required. The adjustable parameter includes at least one of the following: a CPU frequency boost parameter, a CPU core affinity parameter, a frequency modulator parameter, an L3 cache frequency parameter, or the like; a GPU frequency parameter and a power management (e.g., always-on) parameter; and a DDR frequency parameter and an association between the DDR and the CPU.

In terms of the task, the optimization policy may include: scheduling a VIP thread when a runnable state of a key thread is long; performing page-level cache pre-fetching if the I/O delay is long; using TCP to transmit a packet with no-delay if the network delay is relatively long; and performing page fault lock degradation if an uninterruptable sleep state is long. The optimization policy further includes asynchronously executing a relatively-long-time-consuming startup process in advance. The startup process may be at least one of hotspot function compiling, picture decoding, class verification, SO library loading, TCP pre-connecting, or the like.

It can be learned that S302 to S304 are corresponding to current status collection, overheads evaluation, event identification, and policy formulation in the real-time processing subsystem in FIG. 2A and FIG. 2B. Certainly, the real-time processing subsystem may further include a real-time system sub-solution set, and the real-time system sub-solution set is used to schedule each optimization policy from a service side of the framework layer. The sub-solution set includes but is not limited to accelerating the CPU as required, providing memory assurance for starting up a memory-bound application, and the like. In addition, a process from S302 to S304 also relates to obtaining the historical data, a default configuration, and the like from the non-real-time processing subsystem.

S305. The terminal executes the determined optimization policies in the process of cold starting up the application.

Specifically, the real-time processing subsystem in FIG. 2A and FIG. 2B may deliver, by using a collection execution adaptation subsystem, instructions corresponding to the optimization policies to a kernel extension subsystem, so as to execute the optimization policies.

In this way, the terminal obtains, from a plurality of dimensions by collecting current status information, software and hardware configurations related to the cold startup of the application, to analyze, based on the collected information, a problem facing acceleration of the cold startup of the application in this specific scenario. In addition, a policy for the specific problem is used to optimize the cold startup process of the application, so as to reduce a time of cold starting up the application, and more properly allocate the software resource and the hardware resource of the terminal, thereby improving user experience.

It can be learned that in the method described in this application, the hardware configuration of the terminal affects a cold startup policy of an application on the terminal. The following uses two specific scenarios as examples for description. In one scenario, an application on a terminal A is cold started up, and a hardware configuration of the terminal A is relatively low. In the other scenario, an application on a terminal B is cold started up, and a hardware configuration of the terminal B is relatively high.

For the terminal A, the terminal first collects current status information, including a hardware configuration, load of the operating system, resource overheads for cold starting up the application, and duration corresponding to each of a plurality of tasks in a process of cold starting up the application. The hardware configuration may be obtained by an operating system of the terminal A by using some hardware configuration collection means, for example, testing or sensing by using a sensor or an interface, or may be obtained by reading a hardware configuration pre-stored in the terminal A.

The operating system of the terminal A obtains the following hardware configurations: A CPU is a dual-core chip and a specific model is Qualcomm™ 8917, a memory of the terminal A is 2 GB, a GPU is a 308 chip, and a flash memory is a Hynix™ universal flash storage (UFS). It can be learned that the terminal A is a mobile phone with a relatively low hardware configuration. A main bottleneck of the terminal A lies in that a CPU configuration is low, and processing resources are easily insufficient. The terminal A uses an operating system of the Android™ 8.2 version. Because the hardware configuration is relatively low, after the terminal A is powered on, even in a standby state, the operating system of the terminal A is moderately loaded.

After a user uses three or four applications, the operating system detects that CPU load of the terminal A remains at about 60%, available memory space of the terminal A is about 300 megabytes (MB), and I/O wait of the terminal A remains at 10%. Generally, the I/O wait that is higher than 4% belongs to high I/O wait. In other words, when the operating system of the terminal A is in a state of high CPU load, a small available memory size, and high I/O wait, it may be considered that the operating system is heavily loaded. In other words, when the operating system is heavily loaded, the terminal detects an instruction of the user, and the instruction instructs the terminal to start up a camera application.

In addition, the terminal determines, based on the status of the operating system, that resource overheads for cold starting up the camera application are CPU overheads: 30%, I/O overheads (to-be-read disk data): 30 MB, and memory overheads: 800 MB. In a process of starting up the camera application, a memory slow path delay is 1200 ms, an I/O delay is 600 ms, a delay of a thread in a runnable state that runs the application is 500 ms, a delay caused because a thread in a sleep state waits for a lock is 120 ms, and a delay caused by blocking of a main thread by a component loading thread is 300 ms.

Then, the terminal A evaluates, based on the collected information, a main problem that limits a cold startup speed. Based on the collected information, the terminal A obtains through analysis that a main cause of a weak hardware capability of the terminal A is that a CPU processing capability is insufficient. That the system of the terminal A is heavily loaded is reflected in a low available memory rate and high I/O utilization because of the application that is being run. Startup overheads of the camera application are high memory overheads, high CPU overheads, and general I/O overheads. A startup delay of the camera application is mainly caused by the memory slow path delay, the I/O delay, the delay of the thread in the runnable state that runs the application, and the delay caused because the thread in the sleep state waits for the lock.

Then, a plurality of corresponding optimization policies are determined based on an evaluation result.

For example, in terms of the hardware resource, the optimization policy includes prolonging a boost time of the CPU to 5 s. This is because a default boost time of the CPU of the terminal A is 1.5 s, a CPU configuration is relatively low, and the processing resources are insufficient. In terms of reducing the startup delay, the optimization policy includes: reducing a memory allocation time, reducing a runnable time, and reducing the I/O delay. For example, in terms of reducing the memory allocation time, at least one of the following optimization policies may be executed. The optimization policies include: allocating a memory fast killer interface to the camera application in the cold startup process of the camera application, calculating in advance a memory size that needs to be killed, determining that larger memory space is killable, the killed memory space is no longer occupied by another application, or in a startup phase, a background application is prohibited from being restarted up after being killed; and in terms of reducing the runnable time, a background application of the operating system can be frozen for a period of time (for example, a period of time equal to a CPU boost time of cold starting up the application), and the freezing of the background application means that when the camera is cold started up, the background application cannot use CPU resources temporarily; or a CPU scheduling priority of an initialization thread of a component of the camera application may be increased. In terms of reducing the I/O delay, a file for starting up the camera application may be pre-fetched.

After the optimization policies are determined, the terminal may execute the optimization policies in the cold startup process of the camera, to accelerate the cold startup.

In this way, the terminal obtains, from a plurality of dimensions by collecting current status information, software and hardware configurations related to the cold startup of the application, to analyze, based on the collected information, a problem facing acceleration of the cold startup of the application in this specific scenario. In addition, a policy for the specific problem is used to optimize the cold startup process of the application, so as to reduce a time of cold starting up the application, and more properly allocate the software resource and the hardware resource of the terminal, thereby improving user experience. For example, in the foregoing scenario in which the terminal A cold starts up the camera application, if the foregoing manner is not used to optimize the cold startup process, a time for cold starting up the camera application is 5975 ms. If the foregoing manner is used, a time for cold starting up the camera application is 3885 ms.

The following uses another specific scenario as an example for description. A hardware configuration of a terminal B used in this scenario is relatively high, and an application that needs to be cold started up is an e-commerce application, for example, Taobao™ or Amazon™ used for online shopping. Similarly, the terminal first collects current status information.

An operating system of the terminal B obtains the following hardware configuration: A CPU is an 8-core chip and a specific model is Kirin 970, a memory of the terminal B is 6 GB, and a flash memory is Toshiba™ UFS2.0. It can be learned that the terminal B is a mobile phone with a relatively high hardware configuration, and only the flash memory configuration is slightly insufficient. The terminal B uses an operating system of the Android™ 8.2 version. Because the hardware configuration is relatively high, the operating system of the terminal B used by most users is lightly loaded or moderately loaded.

The operating system of the terminal B detects that CPU load of the terminal B is at about 10%, available memory space of the terminal B is about 4 GB, I/O wait of the terminal B is almost 0%, and a network status of the terminal B is good. The operating system of the terminal B is lightly loaded. In other words, when the operating system is lightly loaded, the terminal detects an instruction of a user, and the instruction instructs the terminal to cold start up the e-commerce application.

In addition, the terminal determines, based on the status of the operating system, that application load of the e-commerce application is: CPU overheads: 30%; I/O overheads, including disk data that needs to be read: 100 MB, and disk data that needs to be written: 1 MB; and memory overheads: 259 MB. In a process of cold starting up the application, a network delay is 200 ms, an I/O delay is 500 ms, a delay caused by JIT compiling of some functions in the application is 500 ms, and a delay caused because a thread in a sleep state waits for a lock is 100 ms, a delay caused by a class (e.g., Verifyclass) verification task such as user identity verification is 200 ms, and a delay caused by picture decoding is 60 ms.

Then, the terminal B evaluates, based on the collected information, a main problem that limits a cold startup speed. Based on the foregoing collected information, the terminal B obtains through analysis that a hardware capability of the terminal B is strong, the operating system is lightly loaded, and there are sufficient resources to cold start up the application. The application is an application whose cold startup overheads are general, and a startup delay of the application is mainly caused by the network delay, the I/O delay, and the delay caused by just-in-time compiling of the function.

Then, a plurality of corresponding optimization policies are determined based on an evaluation result. A hardware resource scheduling parameter does not need to be adjusted, and a default policy is used. For example, frequency boost of 1.5 seconds is maintained in both the cold startup and interface switching. In terms of the scheduling delay, for a long I/O delay, page-level file pre-fetching is performed; for a long network delay, a packet is transmitted by using TCP with no-delay; and for a long sleep time, a page fault lock degradation solution is used. In terms of intra-application invoking, for long-time-consuming JIT, a hotspot function speed-profile is compiled in advance; for a long process of the class verification, asynchronous class verification is performed in advance; and for long-time-consuming decoding, asynchronous decoding is performed in advance.

After the optimization policies are determined, the terminal may execute the policies in the cold startup process of the application, to accelerate the cold startup.

In this way, the terminal analyzes, based on the current status information, a problem facing acceleration of the cold startup of the application in this specific scenario. In addition, a policy for the specific problem is used to optimize the cold startup process of the application, so as to reduce a time of cold starting up the application, and more properly allocate the software resource and the hardware resource of the terminal, thereby improving user experience. For example, in the foregoing scenario, if the foregoing manner is not used to optimize the cold startup process, a time for cold starting up the e-commerce application is 3534 ms. If the foregoing manner is used, a time for cold starting up the e-commerce application is 2163 ms.

Figure 4:
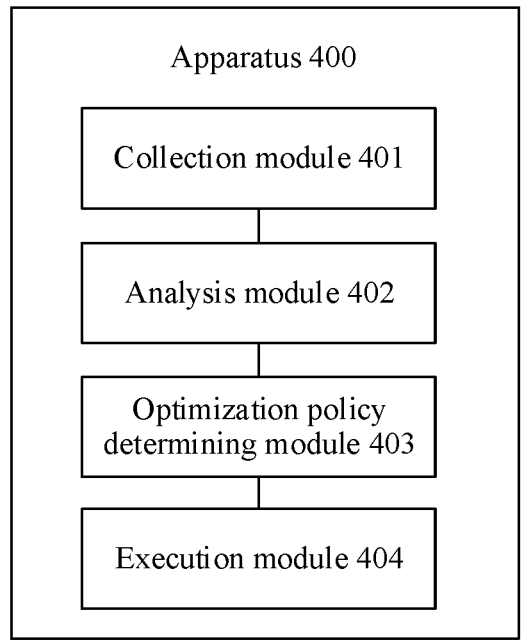
FIG. 4 is a schematic diagram of an apparatus for cold starting up an application according to an embodiment of the present invention.

FIG. 4 shows an apparatus 400 for cold starting up an application according to this application. The apparatus 400 includes a collection module 401, where the collection module 401 is configured to collect current status information based on a detected startup event, the startup event instructs an operating system of a terminal to cold start up an application, and the current status information includes a hardware configuration of the terminal, current load of the operating system, resource overheads for cold starting up the application, and duration corresponding to each of a plurality of tasks in a process of cold starting up the application; an analysis module 402, where the analysis module 402 is configured to determine, based on the current status information, a group of acceleration items corresponding to the application, the group of acceleration items indicate a plurality of objects that need to be optimized in the current process of cold starting up the application; an optimization policy determining module 403, where the optimization policy determining module 403 is configured to determine a plurality of optimization policies corresponding to the group of acceleration items, the plurality of optimization policies include at least one of a first optimization policy and/or a second optimization policy, the first optimization policy instructs to adjust a resource allocated by the operating system to cold start, and the second optimization policy is used to accelerate a task in the cold startup; and an execution module 404, where the execution module 404 is configured to execute the plurality of optimization policies in the process of cold starting up the application.

For specific embodiments and implementation details of the apparatus, refer to the foregoing description of the method. In an embodiment, the collection module 401 in FIG. 4 may be implemented at the framework layer and the kernel library layer in FIG. 2A and FIG. 2B. For example, an instruction for collecting the current status information may be delivered at the framework layer, the hardware configuration of the terminal, the current load of the operating system, the resource overheads for cold starting up the application, and duration corresponding to some tasks in the process of cold starting up the application in the current status information are all generated at the kernel library layer, and duration corresponding to the other of tasks in the process of cold starting up the application may be generated at the framework layer. The analysis module 402 and the optimization policy determining module 403 may also be implemented at the framework layer in FIG. 2A and FIG. 2B, and the execution module 404 may be implemented at the Linux kernel in FIG. 2A and FIG. 2B.

In this way, the acceleration items in the cold startup process may be determined by analyzing information in a plurality of dimensions such as a use scenario of the terminal, the current load of the operating system of the terminal, and system overheads for cold starting up the application, so that the group of optimization policies are more accurately and pertinently determined based on the acceleration items, thereby optimizing the process of cold starting up the application. Therefore, the terminal can complete the cold startup of the application more quickly.

In an embodiment, in the process of cold starting up the application, the plurality of tasks include at least one first task and at least one second task, and the duration corresponding to the plurality of tasks includes respective duration for performing the at least one first task and respective duration for waiting for performing the at least one second task. For example, the first task may be at least one of picture decoding, class verification, SO file loading, or function compiling that are mentioned above, and the second task may be at least one of waiting for using a CPU, zram compression, and disk data reading/writing.

In an embodiment, the analysis module 402 is specifically configured to: analyze the current status information, to obtain evaluation information currently corresponding to the application, where the evaluation information currently corresponding to the application includes a level of the hardware configuration of the terminal, a degree of the current load of the operating system, a type of the resource overheads of the application, and a long-time-consuming task in the cold startup; and determine, based on the evaluation information currently corresponding to the application and a correspondence between evaluation information and an acceleration item, the group of acceleration items currently corresponding to the application.

This is a process in which the operating system analyzes the collected current status information. The analyzing may be specifically performed based on determining logic and a threshold that are stored in the system. The correspondence between the evaluation information and the acceleration item may be stored in at least one of the framework layer and/or the kernel library layer, and the correspondence between the evaluation information and the acceleration item may be that information of each dimension at a different level is corresponding to a group of acceleration items.

In an embodiment, in terms of the determining, based on the evaluation information currently corresponding to the application and a correspondence between evaluation information and an acceleration item, the group of acceleration items currently corresponding to the application, the analysis module 402 is specifically configured to: when the hardware configuration of the terminal is of a first level, the operating system is currently in first level load, the application is of a first resource overheads type, and the long-time-consuming task in the cold startup belongs to a first group of tasks, determine that the application is currently corresponding to a first group of acceleration items; or when the hardware configuration of the terminal is of a second level, the operating system is currently in second level load, the application is of a second resource overheads type, and the long-time-consuming task in the cold startup belongs to a second group of tasks, determine that the application is currently corresponding to a second group of acceleration items.

Two items in at least one of a pair of the first level and the second level, a pair of the first level load and the second level load, a pair of the first resource overheads type and the second resource overheads type, or a pair of the first group of tasks and the second group of tasks are different. For example, the first level and the second level may be different levels, and two items in any of the other three pairs are the same. Certainly, two items in any of the four pairs may alternatively be different. The first group of acceleration items and the second group of acceleration items are two different groups of acceleration items. In other words, in some scenarios, when hardware levels and/or load levels are different, obtained acceleration items are also different even if a same application is cold started up.

In other words, when different levels are obtained by analyzing at least one type of information in the current status information, the different levels are corresponding to different groups of acceleration items.

Certainly, when levels of two items in each of the foregoing four types of information are not completely consistent, acceleration items corresponding to the application are all a same group of acceleration items, for example, the first group of acceleration items.

In an embodiment, the optimization policy determining module 403 is specifically configured to determine, based on the group of acceleration items currently corresponding to the application and a correspondence between an acceleration item and an optimization policy, the plurality of optimization policies corresponding to the group of acceleration items.

For details, refer to the foregoing corresponding paragraphs.

In an embodiment, the current load of the operating system indicates current usage of a hardware resource of the terminal that is used by the operating system, and the hardware resource includes at least one of a processing resource, a storage resource, or a network resource; and the resource overheads for cold starting up the application indicate usage of at least one of a processor, a memory, a disk, or network bandwidth of the terminal in the cold startup.

In an embodiment, the first optimization policy includes adjusting the at least one of the processing resource, the storage resource, and the network resource that are allocated to the cold startup.

In an embodiment, the first optimization policy includes: boosting an operating frequency of a CPU of the terminal, prolonging a time of the CPU frequency boost of the terminal, adjusting an energy consumption parameter of the CPU of the terminal, migrating the process of cold starting up the application to a kernel of another CPU for execution, releasing memory space corresponding to the cold startup process of the application in advance, freezing or clearing at least one another process, and adjusting read/write bandwidth or network bandwidth that is allocated to the at least one another process, where the at least one another process is a process corresponding to at least one application, other than the application, that is run in the operating system; and the second optimization policy includes at least one of the following optimization policies: enabling a Nagle algorithm on a TCP connection corresponding to the application, preferentially using the processing resource by a relatively important thread in the process corresponding to the cold startup, reading a file page required for cold starting up the application in advance, performing class verification in advance, decoding a picture in advance, or loading a basic database in advance.

Figure 5:
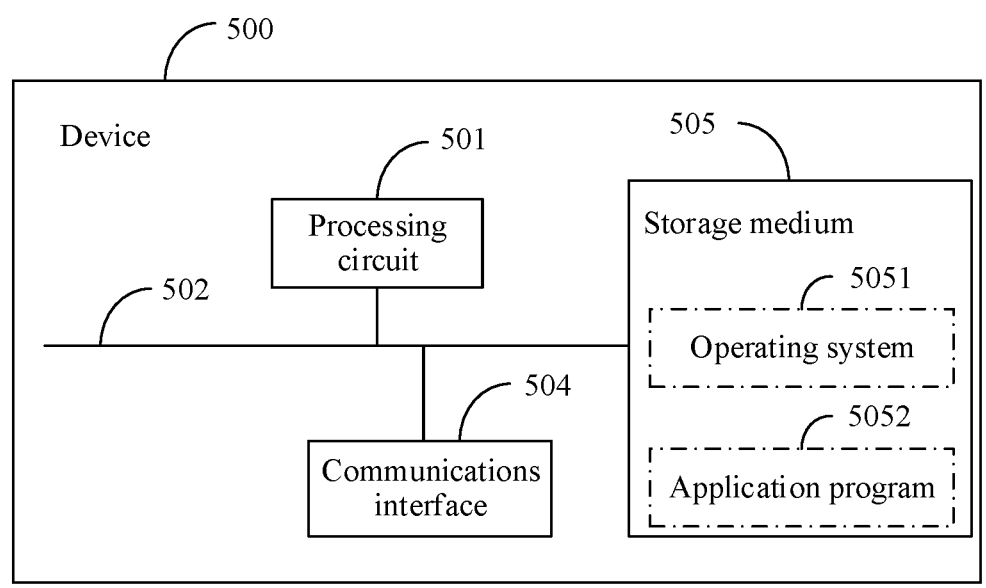
FIG. 5 is a schematic diagram of a device for cold starting up an application according to an embodiment of the present invention.

FIG. 5 describes a structure of a device 500 for cold starting up an application according to this application. The device 500 includes at least one processing circuit 501, a storage medium 502, and a communications interface 504. The device 500 may include at least one network interface and at least one communications bus 605. The communications bus 605 is configured to implement connection and communication between these components. The device 500 optionally includes a user interface, and includes a display (for example, a touchscreen, an LCD, a CRT, a holographic imaging device, or a projector), a keyboard, or a click device (for example, a mouse, a trackball, a touchpad, or a touchscreen).

The storage medium 502 may include a read-only memory and a random access memory, and provide an instruction and data to the processing circuit 501. A part of the storage medium 502 may further include a non-volatile random access memory (NVRAM).

In embodiments of some implementation manners, the storage medium 502 stores the following elements: an executable module or a data structure, or a subset thereof, or an extended set thereof.

The operating system 5021 includes various system programs, for example, the framework layer, the kernel library layer, and the driver layer shown in FIG. 1, or the framework layer, the kernel library layer, and the Linux™ kernel shown in FIG. 2A and FIG. 2B, to implement basic services and process hardware-based tasks. In an embodiment, the collection module 401, the analysis module 402, the optimization policy determining module 403, and the execution module 404 mentioned above are all included in the operating system 5021.

An application program module 5022 includes various application programs, for example, the application that is cold started up described in this application, or for example, a gallery, the Media Player, and the Browser shown in FIG. 1 to implement various application services.

In this embodiment of the present invention, by invoking a program or an instruction stored in the storage medium 502, the processing circuit 501 is configured to collect current status information based on a detected startup event, the startup event instructs an operating system of the terminal to cold start up an application, and the current status information includes a hardware configuration of the terminal, current load of the operating system, resource overheads for cold starting up the application, and duration corresponding to each of a plurality of tasks in a process of cold starting up the application; determines, based on the current status information, a group of acceleration items corresponding to the application, where the group of acceleration items indicate a plurality of objects that need to be optimized in the current process of cold starting up the application; determine a plurality of optimization policies corresponding to the group of acceleration items, where the plurality of optimization policies include at least one of a first optimization policy and a second optimization policy, the first optimization policy instructs to adjust a resource allocated by the operating system to the cold startup, or the second optimization policy is used to accelerate a task in the cold startup; and execute the plurality of optimization policies in the process of cold starting up the application.

The device corresponding to FIG. 5 invokes the program or the instruction stored in the storage medium 502, and the processing circuit 501 may perform any possible embodiment and/or implementation of the method and the apparatus described above. Details are not described herein again. The hardware at the hardware layer described in FIG. 1 may also be considered as a specific embodiment of FIG. 5. For example, the processing circuit 501 in FIG. 5 is represented as the central processing unit and the graphics processing unit in FIG. 1, and the storage medium 502 is represented as the memory in FIG. 1.

In this way, the acceleration items in the cold startup process are determined by analyzing information in a plurality of dimensions such as a use scenario of the terminal, the current load of the operating system of the terminal, and system overheads for cold starting up the application, so that the group of optimization policies are more accurately and pertinently determined based on the acceleration items. By using these optimization policies together, the process of cold starting up the application can be optimized more comprehensively. Therefore, the terminal can complete the cold startup of the application more quickly.

Figure 6:
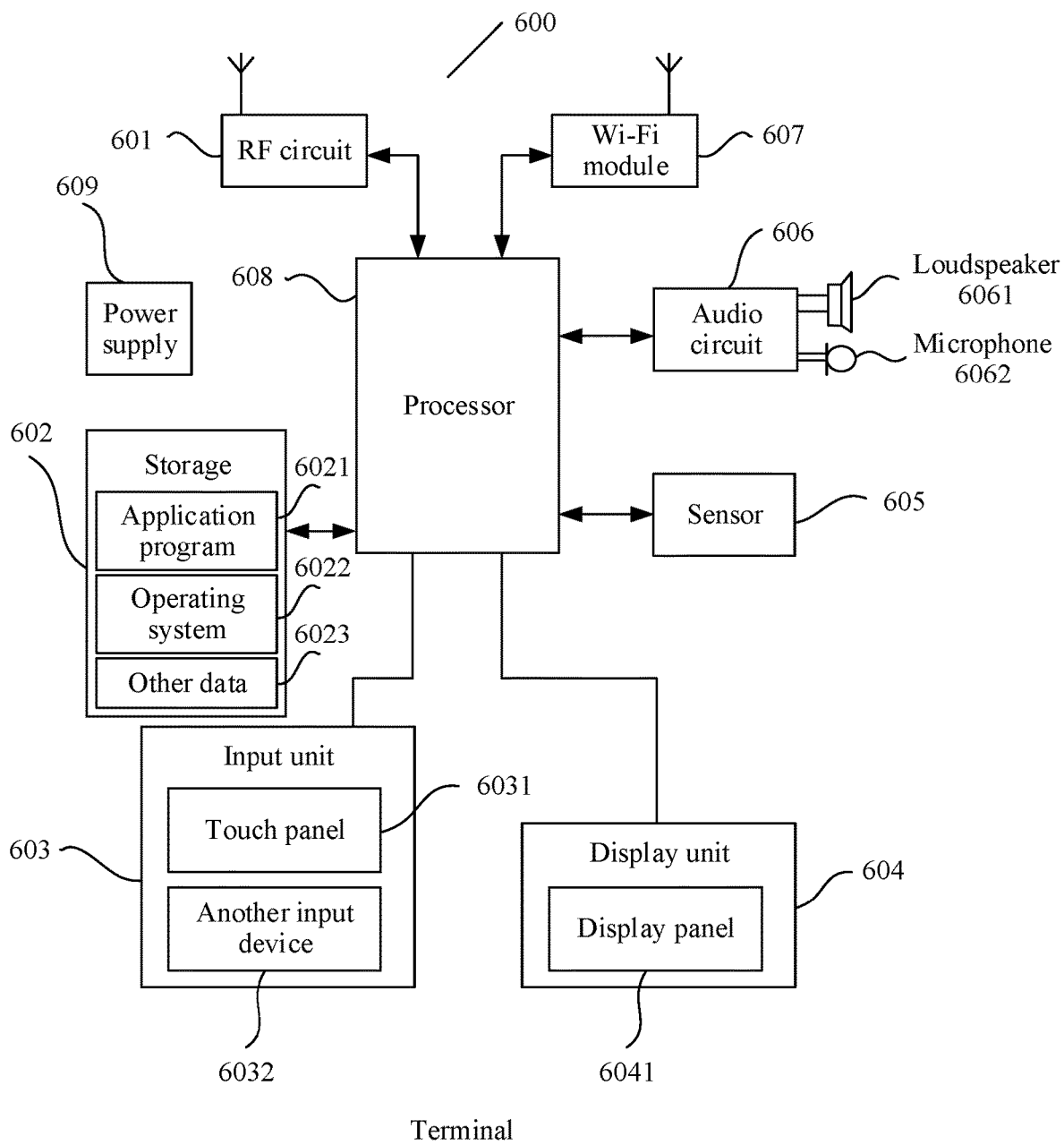
FIG. 6 is a schematic structural diagram of a terminal according to an embodiment of the present invention.

FIG. 6 is a schematic structural diagram of a terminal according to an embodiment of the present invention. The terminal may be configured to perform some or all of the steps of the method for cold starting up an application described above. For example, reference may be made to related descriptions, specific descriptions, and descriptions of beneficial effects that are corresponding to FIG. 3. Details are not described herein again. As shown in FIG. 6, the terminal 600 includes components such as a radio frequency (RF) circuit 601, a storage 602, an input unit 603, a display unit 604, a sensor 605, an audio circuit 606, a wireless fidelity (Wi-Fi) module 607, a processor 608, and a power supply 609. Persons skilled in the art may understand that, the terminal structure shown in FIG. 6 does not constitute a limitation on a mobile phone, and the terminal may include more or fewer components than those shown in the figure, or some components may be combined, or the components may be arranged in a different manner.

FIG. 6 may be understood as a specific embodiment based on FIG. 5. There is a correspondence between some components shown in the two figures. For example, the storage 602 in FIG. 6 is corresponding to the storage medium 502 in FIG. 5, and the processor 608 in FIG. 6 is corresponding to the processing circuit 501 in FIG. 5. The radio frequency (RF) circuit 601 and the wireless fidelity (Wi-Fi) module 607 in FIG. 6 are specific embodiments of the communications interface 504 in FIG. 5. Therefore, the application layer, the framework layer, the kernel layer, and the driver layer in FIG. 1, the various layers and the various subsystems in FIG. 2A and FIG. 2B, and the various modules in FIG. 4 may also be implemented by the processor 608 by invoking code in the storage 602. Certainly, the terminal corresponding to FIG. 6 describes more hardware components than those in FIG. 5.

The RF circuit 601 may be configured to send and receive a signal in an information sending and/or receiving process or a call process. In particular, after receiving downlink information from a base station, the RF circuit 610 sends the downlink information to the processor 608 for processing. In addition, the RF circuit 910 sends uplink-related data to the base station. Usually, the RF circuit 601 includes but is not limited to an antenna, at least one amplifier, a transceiver, a coupler, a low noise amplifier (LNA), a duplexer, and the like. In addition, the RF circuit 601 may further communicate with a network and another device through wireless communication. Any communication standard or protocol may be used in the wireless communication, including but not limited to a Global System for Mobile communications (GSM), a General Packet Radio Service (GPRS), a Code Division Multiple Access (CDMA), a Wideband Code Division Multiple Access (WCDMA), a Long Term Evolution (LTE), an email, a Short Messaging Service (SMS), and the like.

The storage 602 stores a computer program and the computer program includes an application program 6021 and an operating system program 6022. The processor 608 is configured to read the computer program in the storage 602, and then perform a method defined in the computer program. For example, the processor 608 reads the operating system program 6022, to run an operating system on the terminal 600 and implement various functions of the operating system. Alternatively, the processor 608 reads one or more application programs 6021, to run an application on the terminal 600. The operating system 6022 includes a computer program that can implement the method for cold starting up an application provided in this embodiment of the present invention, so that after the processor 608 reads the operating system program 6022 and runs the operating system, the operating system may have a function for cold starting up an application provided in the embodiments of the present invention. In addition, the storage 602 further stores other data 6023 different from the computer program, where the other data 6023 may include data generated after the operating system 6022 or the application program 6021 is run, and the data includes system data (for example, configuration parameters of the operating system) and user data. In addition, the storage 602 generally includes a memory and an external memory. The memory may be a random access memory (RAM), a read-only memory (ROM), a cache (CACHE), or the like. The external memory may be a hard disk, an optical disk, a universal serial bus (USB), a floppy disk, a tape drive, or the like. The computer program is usually stored in the external memory. Before performing processing, the processor loads the computer program from the external memory to the memory.

The input unit 603 may be configured to receive input digit or character information, and generate a key signal input related to a user setting and function control of the terminal 600.

Specifically, the input unit 603 may include a touch panel 6031 and another input device 6032. The touch panel 6031, also referred to as a touchscreen, may collect a touch operation (for example, an operation performed by a user on the touch panel 6031 or near the touch panel 6031 by using any proper object or accessory such as a finger or a stylus) performed by the user on or near the touch panel 951, and drive a corresponding connection apparatus based on a preset program. Optionally, the touch panel 6031 may include two parts: a touch detection apparatus and a touch controller. The touch detection apparatus detects a touch direction of the user, detects a signal brought by the touch operation, and transmits the signal to the touch controller. The touch controller receives touch information from the touch detection apparatus, converts the touch information into touch coordinates, then sends the touch coordinates to the processor 608, and can receive and execute a command sent by the processor 608. In addition, the touch panel may be implemented by using a plurality of types such as a resistive type, a capacitive type, an infrared ray, and a surface acoustic wave type 6031. The input unit 603 may include the another input device 6032 in addition to the touch panel 6031. Specifically, the another input device 6032 may include but is not limited to one or more of a physical keyboard, a function key (for example, a volume control key or an on/off key), a trackball, a mouse, a joystick, and the like.

The display unit 604 may be configured to display information entered by a user, information provided to the user, and various menus of the mobile phone. The display unit 604 may include a display panel 6041. Optionally, the display panel 6041 may be configured in a form of a Liquid Crystal Display (LCD), an Organic Light-Emitting Diode (OLED), or the like. Further, the touch panel 6031 may cover the display panel 6041. When detecting a touch operation on or near the touch panel 6031, the touch panel 6031 transmits the touch operation to the processor 608 to determine a type of a touch event, and then the processor 608 provides a corresponding visual output on the display panel 6041 based on the type of the touch event. In FIG. 6, the touch control panel 6031 and the display panel 6041 are used as two independent components to implement input and output functions of the mobile phone. However, in some embodiments, the touch panel 6031 and the display panel 6041 may be integrated to implement the input and output functions of the mobile phone.

The sensor 605 may be a light sensor, a motion sensor, or another sensor. Specifically, the optical sensor may include an ambient light sensor and a proximity sensor. The ambient light sensor may adjust luminance of the display panel 6041 based on brightness of ambient light, and when the mobile phone approaches an ear, the proximity sensor may turn off the display panel 6041 and/or backlight. As a type of motion sensor, an accelerometer sensor may detect a value of acceleration in each direction (usually on three axes), may detect a value and a direction of gravity in a stationary state, and may be used in an application for identifying a mobile phone posture (such as screen switching between a landscape mode and a portrait mode, a related game, or magnetometer posture calibration), a function related to vibration identification (such as a pedometer or a knock), or the like. Other sensors such as a gyroscope, a barometer, a hygrometer, a thermometer, or an infrared sensor may be further configured in the mobile phone. Details are not described herein again.

For example, the startup event described in this application may be that a user touches the display unit 604, and a pressure signal is transmitted by the sensor 605 to the terminal.

The audio frequency circuit 606, a loudspeaker 6061, and a microphone 6062 may provide an audio interface between the user and the mobile phone. The audio frequency circuit 606 may convert received audio data into an electrical signal, and transmit the electrical signal to the loudspeaker 6061, and the loudspeaker 6061 converts the electrical signal into a sound signal for output. In addition, the microphone 6062 converts a collected sound signal into an electrical signal, and the audio frequency circuit 606 receives the electrical signal, converts the electrical signal into audio data, and outputs the audio data to the processor 608 for processing, so as to send the audio data to, for example, another mobile phone by using the RF circuit 601, or output the audio data to the storage 602 for further processing.

Wi-Fi is a short-range wireless transmission technology, and the terminal may help, by using the Wi-Fi module 607, the user to send and/or receive an e-mail, browse a web page, access streaming media, and the like. The Wi-Fi module 607 provides wireless broadband internet access for the user. Although FIG. 6 shows the Wi-Fi module 607, it can be understood that the Wi-Fi module 607 is not a necessary component of the terminal and may be omitted completely as required provided that the essence of the present invention is not changed.

The processor 608 is a control center of the terminal, and connects all parts of the entire terminal by using various interfaces and lines. By running or executing a software program and/or a module stored in the storage 602 and invoking data stored in the storage 602, the processor 608 performs various functions of the terminal and data processing, to perform overall monitoring on the terminal. Optionally, the processor 608 may include one or more processors. For example, the processor 608 may include one or more central processing units, or include one central processing unit and one graphics processing unit. When the processor 608 includes a plurality of processors, the plurality of processors may be integrated in a same chip, or may be chips separate from each other. One processor may include one or more processing cores.

The terminal 600 further includes the power supply 609 (for example, a battery) that supplies power to the components. Preferably, the power supply may be logically connected to the processor 608 by using a power supply management system. In this way, functions such as management of charging, discharging, and power consumption are implemented by using the power supply management system.

Although not shown in the figure, the terminal may further include a camera, a Bluetooth module, and the like. Details are not described herein again.

In the foregoing embodiment, the method procedure of each step and the apparatus 400 corresponding to FIG. 4 may also be implemented based on a structure of the terminal. All in FIG. 1 may be considered as components of an abstract structure of the processor 608.

In this embodiment of the present invention, the processor 608 is configured to perform the following operations by invoking program code stored in the storage 602:

collecting, by a terminal, current status information based on a detected startup event, the startup event instructs an operating system of the terminal to cold start up an application, and the current status information includes a hardware configuration of the terminal, current load of the operating system, resource overheads for cold starting up the application, and duration corresponding to each of a plurality of tasks in a process of cold starting up the application; determining, based on the current status information, a group of acceleration items corresponding to the application, where the group of acceleration items indicate a plurality of objects that need to be optimized in the current process of cold starting up the application; determining a plurality of optimization policies corresponding to the group of acceleration items, where the plurality of optimization policies include at least one of a first optimization policy and/or a second optimization policy, the first optimization policy instructs to adjust a resource allocated by the operating system to the cold startup, and the second optimization policy is used to accelerate a task in the cold startup; and executing the plurality of optimization policies in the process of cold starting up the application.

The device corresponding to FIG. 6 invokes the program or the instruction stored in the storage 602, and the processor 608 may perform any possible embodiment of the method and the apparatus described above. Details are not described herein again.

In this way, the acceleration items in the cold startup process may be determined by analyzing information in a plurality of dimensions such as a use scenario of the terminal, the current load of the operating system of the terminal, and system overheads for cold starting up an application, so that the group of optimization policies are more accurately and pertinently determined based on the acceleration items. By using these optimization policies together, the process of cold starting up the application can be optimized more comprehensively. Therefore, the terminal can complete the cold startup of the application more quickly.

It should be noted that, to make the description brief, the foregoing method embodiments are expressed as a series of actions. However, persons skilled in the art should appreciate that the present invention is not limited to the described action sequence, because according to the present invention, some steps may be performed in other sequences or performed simultaneously. In addition, persons skilled in the art should also appreciate that all the embodiments described in the specification are example embodiments, and the related actions and modules are not necessarily mandatory to the present invention.

In the foregoing embodiments, the description of each embodiment has respective focuses. For a part that is not described in detail in an embodiment, refer to related descriptions in other embodiments.

In the several embodiments provided in this application, it should be understood that the disclosed apparatus may be implemented in other manners. For example, the described apparatus embodiment is merely an example. For example, the module division is merely logical function division and may be other division in actual implementation. For example, a plurality of modules or components may be combined or integrated into another system, or some features may be ignored or may not be performed. In addition, the displayed or discussed mutual couplings or direct couplings or communication connections may be implemented through some interfaces. The indirect couplings or communication connections between the apparatuses or modules may be implemented in electrical or other forms.

The modules described as separate parts may or may not be physically separate, and parts displayed as modules may or may not be physical modules, may be located in one position, or may be distributed on a plurality of network modules. Some or all the modules may be selected according to actual needs to achieve the objectives of the solutions of the embodiments.

In addition, functional modules in the embodiments of the present invention may be integrated into one processing module, or each of the modules may exist alone physically, or two or more modules are integrated into one module. The integrated module may be implemented in a form of hardware, or may be implemented in a form of a software functional module.

When the integrated module is implemented in the form of a software functional module and sold or used as an independent product, the integrated unit may be stored in a computer readable storage. Based on such an understanding, the technical solutions of the present invention essentially, or the part contributing to the prior art, or all or some of the technical solutions may be implemented in the form of a software product. The software product is stored in a memory and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a read-only memory (ROM), a random access memory (RAM), a removable hard disk, a magnetic disk, or an optical disc.

Persons of ordinary skill in the art may understand that all or some of the steps of the methods in the embodiments may be implemented by a program instructing relevant hardware. The program may be stored in a computer readable storage medium. The storage medium may include a flash memory, a read-only memory (ROM), a random access memory (RAM), a magnetic disk, and an optical disc.

The embodiments of the present invention are described in detail above. In this specification, the principle and implementation of the present invention are described herein through specific examples. The description about the embodiments is merely provided to help understand the method of the present invention. In addition, persons of ordinary skill in the art can make variations and modifications to the present invention in terms of the specific implementations and application scopes according to the content recorded in the application file. Therefore, the content of this specification shall not be construed as a limit to the present invention.

What is claimed is:

1. A method for cold starting up an application, comprising:

collecting, by a terminal, current status information based on a detected startup event, wherein the startup event instructs an operating system of the terminal to cold start up an application, and the current status information comprises a hardware configuration of the terminal, current load of the operating system, resource overheads for cold starting up the application, and duration corresponding to each of a plurality of tasks in a process of cold starting up the application;

determining, based on the current status information, a group of acceleration items corresponding to the application that indicate at least one resource and at least one task that are to be optimized in the current process of cold starting up the application, wherein when the hardware configuration of the terminal is of a first level, the operating system is currently in first level load, the application is of a first resource overheads type, and a long-time-consuming task in the cold startup belongs to a first group of tasks, the application is currently corresponding to a first group of acceleration items; or when the hardware configuration of the terminal is of a second level, the operating system is currently in second level load, the application is of a second resource overheads type, and the long-time-consuming task in the cold startup belongs to a second group of tasks, the application is currently corresponding to a second group of acceleration items;

determining one or more optimization policies corresponding to the group of acceleration items, wherein the one or more optimization policies comprise one or more of a first optimization policy, a second optimization policy, or a combination thereof, and the first optimization policy instructs an adjustment of a resource allocated by the operating system to the cold startup, and the second optimization policy accelerates a task in the cold startup; and executing the one or more determined optimization policies in the process of cold starting up the application.

2. The method according to claim 1, wherein the determining, based on the current status information, the group of acceleration items comprises:

analyzing the current status information to obtain evaluation information currently corresponding to the application, wherein the evaluation information currently corresponding to the application comprises the level of the hardware configuration of the terminal, the degree of the current load of the operating system, the type of the resource overheads of the application, and the long-time-consuming task in the cold startup; and determining, based on the evaluation information currently corresponding to the application and a correspondence between evaluation information and an acceleration item, the group of acceleration items currently corresponding to the application.

3. The method according claim 1, wherein the determining the one or more optimization policies corresponding to the group of acceleration items comprises:
determining, based on the group of acceleration items corresponding to the application and a correspondence between an acceleration item and an optimization policy, the plurality of optimization policies corresponding to the group of acceleration items.

4. The method according to claim 1, wherein the current load of the operating system indicates current usage of a hardware resource of the terminal that is used by the operating system, and the hardware resource comprises at least one of a processing resource, a storage resource, or a network resource; and the resource overheads for cold starting up the application indicate usage of at least one of a processor, a memory, a disk, or network bandwidth of the terminal in the cold startup.

5. The method according to claim 4, wherein the first optimization policy comprises adjusting the at least one of the processing resource, the storage resource, or the network resource that are allocated to the cold startup.

6. The method according to claim 1, wherein in the process of cold starting up the application, the plurality of tasks comprise at least one first task and at least one second task, and the duration corresponding to the plurality of tasks comprises respective duration for performing the at least one first task and respective duration for waiting for performing the at least one second task.

7. The method according to claim 1, wherein the first optimization policy comprises at least one of: boosting an operating frequency of a central processing unit (CPU) of the terminal, prolonging a time of the CPU frequency boost of the terminal, adjusting an energy consumption parameter of the CPU of the terminal, migrating the process of cold starting up the application to a kernel of another CPU for execution, releasing memory space corresponding to the cold startup process of the application in advance, freezing or clearing at least one another process, or adjusting read/write bandwidth or network bandwidth that is allocated to the at least one another process, wherein the at least one another process is a process of at least one application, other than the application, that is run in the operating system; and
the second optimization policy comprises at least one of the following optimization policies: enabling a Nagle algorithm on a transmission control protocol (TCP) connection corresponding to the application, using the processing resource by a thread having a greater importance than one or more other threads in the process corresponding to the cold startup, reading a file page required for cold starting up the application in advance, performing class verification in advance, decoding a picture in advance, or loading a basic database in advance.

8. A terminal for cold starting up an application, comprising:
a processing circuit; and
a storage medium, storing an instruction, wherein the processing circuit is configured to run the instruction stored in the storage medium, to implement operations, comprising:
collecting, current status information based on a detected startup event, wherein the startup event instructs an operating system of the terminal to cold start up an application, and the current status information comprises a hardware configuration of the terminal, current load of the operating system, resource overheads for cold starting up the application, and duration corresponding to each of a plurality of tasks in a process of cold starting up the application,
determining, based on the current status information, a group of acceleration items corresponding to the application that indicate at least one resource and at least one task that are to be optimized in the current process of cold starting up the application, wherein when the hardware configuration of the terminal is of a first level, the operating system is currently in first level load, the application is of a first resource overheads type, and a long-time-consuming task in the cold startup belongs to a first group of tasks, the application is currently corresponding to a first group of acceleration items; or when the hardware configuration of the terminal is of a second level, the operating system is currently in second level load, the application is of a second resource overheads type, and the long-time-consuming task in the cold startup belongs to a second group of tasks, the application is currently corresponding to a second group of acceleration items;
determining one or more optimization policies corresponding to the group of acceleration items, wherein the one or more optimization policies comprise one or more of a first optimization policy, a second optimization policy, or a combination thereof, and the first optimization policy instructs an adjustment of a resource allocated by the operating system to the cold startup, and the second optimization policy accelerates a task in the cold startup, and
executing the one or more determined optimization policies in the process of cold starting up the application.

9. The apparatus according to claim 8, wherein the determining, based on the current status information, the group of acceleration items comprises:
analyzing the current status information, to obtain evaluation information currently corresponding to the application, wherein the evaluation information currently corresponding to the application comprises the level of the hardware configuration of the terminal, the degree of the current load of the operating system, the type of the resource overheads of the application, and the long-time-consuming task in the cold startup; and
determining, based on the evaluation information currently corresponding to the application and a correspondence between evaluation information and an acceleration item, the group of acceleration items currently corresponding to the application.

10. The apparatus according to claim 8, wherein the determining the one or more optimization policies corresponding to the group of acceleration items comprises:
determining, based on the group of acceleration items corresponding to the application and a correspondence between an acceleration item and an optimization policy, the plurality of optimization policies corresponding to the group of acceleration items.

11. The apparatus according to claim 8, wherein the current load of the operating system indicates current usage of a hardware resource of the terminal that is used by the operating system, and the hardware resource comprises at least one of a processing resource, a storage resource, or a network resource; and the resource overheads for cold starting up the application indicate usage of at least one of a processor, a memory, a disk, or network bandwidth of the terminal in the cold startup.

12. The apparatus according to claim 11, wherein the first optimization policy comprises adjusting the at least one of the processing resource, the storage resource, or the network resource that are allocated to the cold startup.

13. A computer readable storage medium, comprising an instruction, wherein when the instruction is run on a processor of a terminal, causing the processor of the terminal to perform operations:
collecting, current status information based on a detected startup event, wherein the startup event instructs an operating system of the terminal to cold start up an application, and the current status information comprises a hardware configuration of the terminal, current load of the operating system, resource overheads for cold starting up the application, and duration corresponding to each of a plurality of tasks in a process of cold starting up the application;
determining, based on the current status information, a group of acceleration items corresponding to the application that indicate at least one resource and at least one task that are to be optimized in the current process of cold starting up the application, wherein when the hardware configuration of the terminal is of a first level, the operating system is currently in first level load, the application is of a first resource overheads type, and a long-time-consuming task in the cold startup belongs to a first group of tasks, the application is currently corresponding to a first group of acceleration items; or when the hardware configuration of the terminal is of a second level, the operating system is currently in second level load, the application is of a second resource overheads type, and the long-time-consuming task in the cold startup belongs to a second group of tasks, the application is currently corresponding to a second group of acceleration items;
determining one or more optimization policies corresponding to the group of acceleration items, wherein the one or more optimization policies comprise one or more of a first optimization policy, a second optimization policy, or a combination thereof, and the first optimization policy instructs an adjustment of a resource allocated by the operating system to the cold startup, and the second optimization policy accelerates a task in the cold startup; and
executing the one or more determined optimization policies in the process of cold starting up the application.

14. The computer readable storage medium according to claim 13, wherein the determining, based on the current status information, the group of acceleration items comprises:
analyzing the current status information, to obtain evaluation information currently corresponding to the application, wherein the evaluation information currently corresponding to the application comprises the level of the hardware configuration of the terminal, the degree of the current load of the operating system, the type of the resource overheads of the application, and the long-time-consuming task in the cold startup; and
determining, based on the evaluation information currently corresponding to the application and a correspondence between evaluation information and an acceleration item, the group of acceleration items currently corresponding to the application.

15. The computer readable storage medium according to claim 13, wherein the determining the one or more optimization policies corresponding to the group of acceleration items comprises:
determining, based on the group of acceleration items corresponding to the application and a correspondence between an acceleration item and an optimization policy, the plurality of optimization policies corresponding to the group of acceleration items.

16. The computer readable storage medium according to claim 13, wherein the current load of the operating system indicates current usage of a hardware resource of the terminal that is used by the operating system, and the hardware resource comprises at least one of a processing resource, a storage resource, or a network resource; and the resource overheads for cold starting up the application indicate usage of at least one of a processor, a memory, a disk, or network bandwidth of the terminal in the cold startup.

17. The computer readable storage medium according to claim 16, wherein the first optimization policy comprises adjusting the at least one of the processing resource, the storage resource, or the network resource that are allocated to the cold startup.

* * * * *